(12) United States Patent
De Laurentiis

(10) Patent No.: US 10,536,191 B1
(45) Date of Patent: Jan. 14, 2020

(54) MAINTAINING CONSISTENT AUDIO SETTING(S) BETWEEN WIRELESS HEADPHONES

(71) Applicant: Amazon Technologies, Inc., Seattle, WA (US)

(72) Inventor: Nico De Laurentiis, San Diego, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/104,815

(22) Filed: Aug. 17, 2018

(51) Int. Cl.
| | |
|---|---|
| *H04W 4/80* | (2018.01) |
| *H04B 5/00* | (2006.01) |
| *H04M 1/60* | (2006.01) |
| *H04R 1/10* | (2006.01) |
| *H04B 5/02* | (2006.01) |

(52) U.S. Cl.
CPC ............. *H04B 5/0006* (2013.01); *H04B 5/02* (2013.01); *H04M 1/6066* (2013.01); *H04R 1/1041* (2013.01); *H04M 2250/02* (2013.01); *H04R 2420/07* (2013.01)

(58) Field of Classification Search
CPC ................................ H04B 5/0006; H04B 5/02
See application file for complete search history.

(56) References Cited

U.S. PATENT DOCUMENTS

2017/0366924 A1* 12/2017 Thoen ..................... H04L 1/245

\* cited by examiner

*Primary Examiner* — Tuan H Nguyen
(74) *Attorney, Agent, or Firm* — Lee & Hayes, P.C.

(57) ABSTRACT

An audio system including a first wireless headphone and a second wireless headphone. The first wireless headphone receives audio data from a mobile device via a first communication channel and transmits the audio data to a second wireless headphone via a second communication channel. The first wireless headphone may receive data corresponding to setting(s) of the audio system, configure the first wireless headphone according to the setting(s), transmit the data corresponding to the setting(s) to the second wireless headphone via the second communication channel and/or a third communication channel, and receive an indication that the second wireless headphone is configured according to the setting(s).

21 Claims, 12 Drawing Sheets

MAINTAINING CONSISTENT AUDIO SETTING(S) BETWEEN WIRELESS HEADPHONES

BACKGROUND

Mobile electronic devices may include means for transmitting digital content for output on varying types of loudspeakers, such as home speakers, in-ear headphones, and the like. For instance, a mobile device may transmit audio data associated with a song to one or more wireless headphones for output at the wireless headphones. In these instances, changes in audio settings, such as volume, may be received at the mobile device, the wireless headphones, or both. Regardless of the component that receives the initial request to change an audio setting, however, it is important to maintain accurate and consistent audio settings at each of the wireless headphones.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
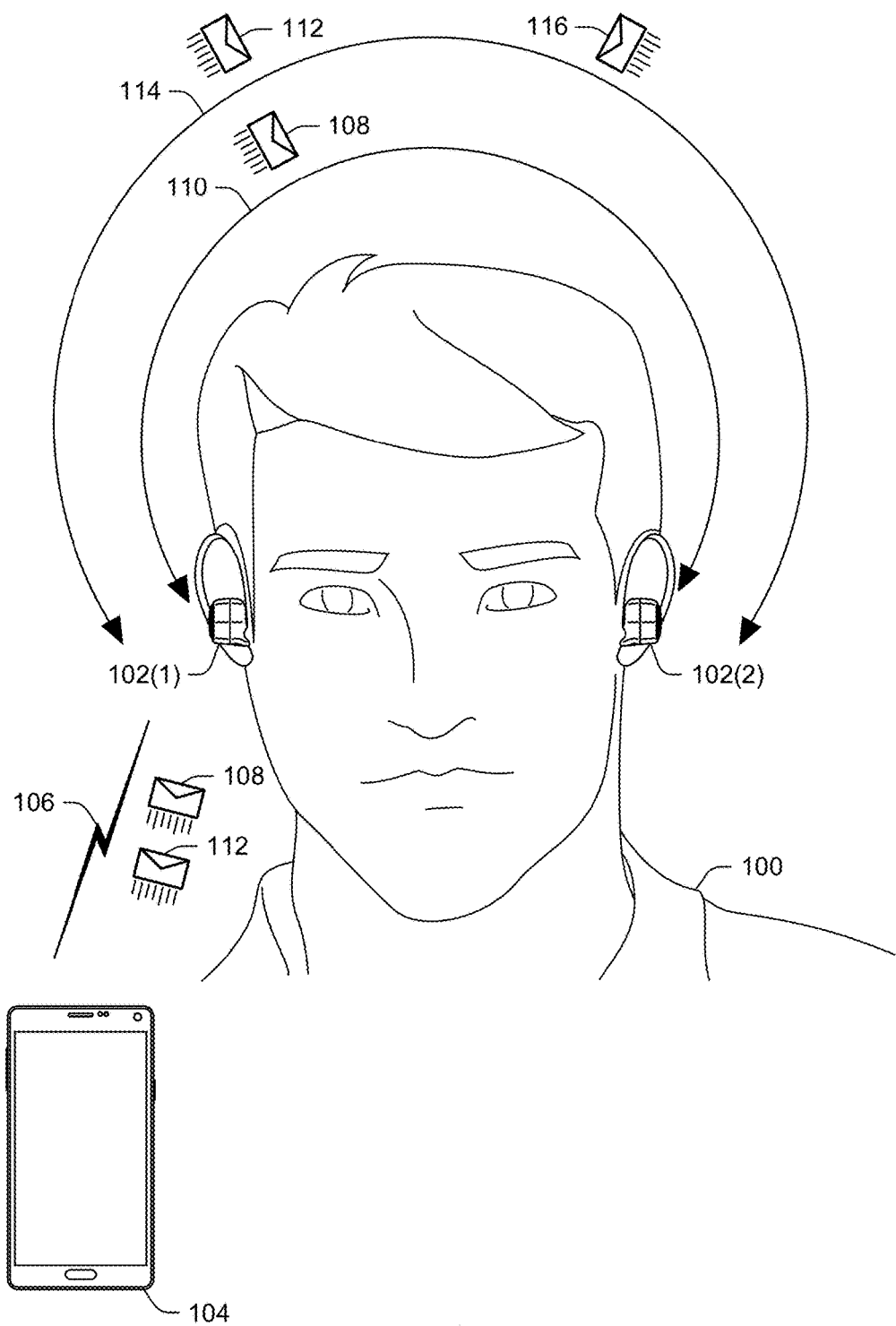
FIG. 1 illustrates a user wearing example wireless headphones. In this example, the wireless headphones are in communication with each other over a first communication channel, over which audio data is sent, and over a second communication channel, over which audio-setting data is sent. Additionally, one of the wireless headphones may be in communication with a mobile device via yet another communication channel, over which audio data is sent to the wireless headphone from the mobile device.

As discussed above, wireless headphones may be configured according to different audio settings. For instance, the wireless headphones may be configured to output audio at a certain volume, skip a track (e.g., song), mute the audio, and so forth. Additionally, the wireless headphones may be configured to perform various commands, such as answering phone calls or performing noise-cancellation. In some instances, the setting(s) may be configured and/or the command(s) may be performed using voice or touch input received at the wireless headphones and/or at a mobile device in communication with one or more of the wireless headphones.

Accordingly, this disclosure describes techniques for maintaining consistent audio setting(s) between wireless speakers, wireless earbuds, and/or other forms of wireless headphones (e.g., in-ear, over-ear, on-ear, etc.). One or more of the wireless headphones may be in communication with an electronic device, such as a mobile device (e.g., phone, tablet, laptop, etc.), and the wireless headphones may include multiple (e.g., two, three, etc.) wireless headphones that are synched, paired, or otherwise in communication with one another. In the examples described below, the techniques are discussed with reference to a pair of wireless headphones communicatively coupled to one another.

In some instances, a first wireless headphone of the pair may receive audio data from the mobile device for output by the wireless headphones. The audio data may relate to any audio capable of being outputted by the wireless headphones, such as a song, a phone call, podcasts, and so forth. The first wireless headphone may receive the audio data from the mobile device via a first communication channel, such as Bluetooth or another wireless communication protocol, for output at the first wireless headphone.

The first wireless headphone may transmit the audio data to the second wireless headphone using a second communication channel. In some instances, the first communication channel and the second communication may be the same or different. For instance, the first wireless headphone may transmit the audio data to the second wireless headphone using near field magnetic induction (NFMI). Generally, NFMI may be used for near-field communication (NFC) and is a wireless protocol that uses a modulated magnetic field to induce a current into a receiving coil (e.g., located at the second wireless headphone). After receiving the audio data, the second wireless headphone may output the audio synchronously with the first wireless headphone.

In addition to receiving and outputting audio data, the wireless headphones may be configured to modify output of the audio according to updated setting(s) received at the headphones or at the mobile device wirelessly coupled to one or more of the headphones. For instance, a user may request to increase a volume of the audio via selection of a physical or soft button on the mobile device, via the first wireless headphone, via the second wireless headphone, and/or the like. For example, the user may increase the volume on the mobile device by pressing buttons on the mobile device or interacting with a user interface on the mobile device. The volume setting selected on the mobile device may then be transmitted to the first wireless headphone over the first communication channel for output at the first wireless headphone.

In order to ensure that the wireless headphones output audio in a consistent manner (e.g., at the same volume), the first wireless headphone transmits the setting(s) to the second wireless headphone. In some instances, the first wireless headphone may delay output of the audio data according to the updated setting(s) until receiving an indication (or for a predetermined period of time) that the second wireless headphone is configured according to the updated setting(s). In this way, the wireless headphones may synchronously output the audio data at the updated setting(s).

In some instances, the first wireless headphone transmits the setting(s) to the second wireless headphone over a third communication channel. In some instances, the third communication channel may be different than the second communication channel used to transmit the audio data between the wireless headphones. As an example, the third communication channel may include Bluetooth Low Energy (BLE) or another type of wireless communication channel. However, in some instances, the third communication channel may include NFMI either at a similar or different frequency as the second communication channel.

The techniques described herein thus enable the first wireless headphone and the second wireless to wirelessly transmit and wirelessly receive data from one another over two different communication channels, which in turn may differ from the communication channel used to transmit the audio data from the mobile device to the first headphone. That is, the mobile device may transmit the audio data to the first wireless headphone via the first communication channel, while the first wireless headphone may transmit this audio data to the second wireless headphone via the second communication channel. In addition, the first wireless headphone and the second wireless headphone may transmit updated settings to one another using the third communication channel. Of course, while the headphones may utilize two different communication channels for communicating with one another (one for audio data and one for setting data), in other instances the headphone may communicate the audio data and the setting data over a single communication channel.

As noted above, a user may update an audio setting via the mobile device or may directly interact with one of the wireless headphones to do so. For instance, the first wireless headphone and/or the second wireless headphone may receive a user input associated with increasing the volume of a song being played by the wireless headphones, skipping to a next song, answering a phone call, or the like. In these instances, the wireless headphones may include one or more sensors (e.g., an accelerometer, a capacitive touch surface, etc.) to receive the user input. Depending on the sensor(s) of the wireless headphones, the user input may include a tap on or at the wireless headphones, a button-press on a button of the wireless headphones, or the like. In response to one of the headphones receiving the user input, the headphone that received the user input may send, over the third communication channel, an indication of the updated setting to the headphone that did not.

In still other instances, one or more of the wireless headphones may include a microphone and/or voice-processing components to generate an audio signal that includes a voice command of a user. This voice command, may include, for instance, a request to increase the volume of the audio or otherwise change an audio setting at the headphones. In these instances, the voice-processing components on the headphones, the mobile device, and/or a remote system may perform speech processing on the audio signal to identify the voice command. In response to identifying the voice command, a first of the wireless headphones may send an indication of the updated setting to a second of the wireless headphones over a wireless communication channel. Thereafter, each of the headphones may output the audio in accordance with the updated setting.

In some instances, the setting(s) described herein may be associated with a command or instruction to be performed by the wireless headphones. For instance, the instruction may relate to cease output of the audio data, answering a phone call, muting one or more microphones, noise-canceling, equalizer settings (e.g., bass, treble, etc.), hanging up a phone call, and so forth. To provide an example, if the mobile device receives a phone call at a time when the mobile device is causing the wireless headphones to output a song, upon receiving an indication to answer the phone call the mobile device may transmit, to the first headphone and over the first communication channel, an instruction to cease output of the song. In addition, the mobile device may transmit audio data corresponding to the phone call to the first wireless headphone using the first communication channel. The first wireless headphone may in turn transmit the audio data corresponding to the phone call to the second wireless headphone using the second communication channel.

In the above example, the user may choose to answer the incoming phone call using the mobile device or a gesture received by the wireless headphones (e.g., the first wireless headphone). For instance, the user may double tap on the first wireless headphone to answer the incoming phone call. When received at the first wireless headphone, data associated with this gesture may be transmitted to the mobile device, and in response, the incoming phone call may be answered at the mobile device. Upon answering, audio data associated with the phone call may be transmitted from the mobile device to the first wireless headphone using the first communication channel. In addition to outputting audio associated with the phone call, the first wireless headphone may transmit the audio data associated with the phone call to the second wireless headphone via the second communication channel (e.g., NFMI).

Conversely, the double tap to answer the phone call may be received at the second wireless headphone that does not communicatively couple to the mobile device. Here, the second wireless headphone may transmit data indicative of the gesture to the first wireless headphone. This gesture may be received by the first wireless headphone via the third communication channel and then transmitted to the mobile device in order to answer the incoming phone call.

In some instances, the wireless headphones may be configured to transmit an indication to each other indicating that the wireless headphone has been configured according to the setting(s). For instance, if the second wireless headphone transmits an indication of an updated setting to the first wireless headphone, the first wireless headphone may transmit an indication to the second wireless headphone indicating that the first wireless headphone has been configured according to the setting after doing so. Such communication may occur over the second communication channel and/or the third communication channel. In some instances, if the second wireless headphone does not receive the indication after a predetermined or threshold amount of time, the second wireless headphone may again transmit the indication of the updated setting.

Given that both the first wireless headphone and the second wireless are capable of receiving user inputs, in some instances the wireless headphones may receive conflicting instructions. For instance, the first wireless headphone may receive a first user input comprising a request to increase a volume, while the second wireless headphone may receive a second user input comprising a request to decrease the volume. In this instance, the first wireless headphone may transmit an indication of the volume-increase request to the second wireless headphone, while the second wireless headphone may transmit an indication of the volume-decrease request to the first wireless headphone. In other words, each wireless headphone may transmit conflicting setting(s) to one another.

To handle these potential conflicts, the techniques described herein may designate one of the wireless headphones a primary headphone and the other a secondary headphone. In some instances, the wireless headphone that is currently wirelessly coupled to the mobile device may be designated as the primary headphone, while the other headphone that receives the audio data from the primary headphone may be designated as the secondary headphone. The secondary wireless headphone may therefore yield to the request received at the primary headphone and may configure its settings according to this request. Thereafter, the secondary wireless headphone may configure its setting according to the request that it received. To maintain consistency between the wireless headphones, the secondary wireless headphone may then transmit the second setting to the primary wireless headphone such that the primary wireless headphone is also configured according to the second setting.

In some instances, prior to the first wireless headphone receiving an indication that the second wireless headphone is configured, the first wireless headphone may "lock" its setting(s) such that the first wireless headphone is unable to receive or configure its setting(s) until receiving the indication from the second wireless headphone. In this scenario, such "locking" may ensure that both wireless headphones are up-to-date with each other at all times and that the first wireless headphone does not configure to different setting(s) than transmitted to the second wireless headphone. In some instances, after receiving the indication, the first wireless headphone may "unlock" its setting(s) so as to configure according to other setting(s), such as those received at or by the second wireless headphone.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a user 100 wearing a first wireless headphone 102(1) and a second wireless headphone 102(2). The first wireless headphone 102(1) and the second wireless headphone 102(2) may collectively be referred to herein as "the wireless headphones 102." In some instances, the first wireless headphone 102(1) and the second wireless headphone 102(2) may be physically similar and look alike. In some instances, the first wireless headphone 102(1) and the second wireless headphone 102(2) may be physically indistinguishable by the user 100, while in other instances one of the headphones may be designed for and designated as a right headphone while the other may be designed for and designated as a left headphone. In this example, the first wireless headphone 102(1) is shown residing within the right ear of the user 100 while the second wireless headphone 102(2) is shown residing within the left ear of the user 100. In some instances, the wireless headphones 102 may resemble earbud headphones that fit within the ear and/or ear canal of the user, while in other instances the headphones may reside atop the ear of the user 100.

The first wireless headphone 102(1) may be communicatively coupled to a mobile device 104 using a first communication channel 106. In some instances, the first communication channel 106 may include Bluetooth (e.g., 802.11), ZigBee (e.g., 802.15.4), Z-wave, or the like. The first wireless headphone 102(1) may receive audio data 108 from the mobile device 104 over the first communication channel 106. The audio data 108 may be related to a song, or other audio, to be output by the wireless headphones 102. The first wireless headphone 102(1) may output the song through a speaker of the first wireless headphone 102(1).

The first wireless headphone 102(1) may be communicatively coupled to the second wireless headphone 102(2) using a second communication channel 110. The first wireless headphone 102(1) may transmit the audio data 108 to the second wireless headphone 102(2) via the second communication channel 110. The second wireless headphone 102(2) may output the song through a speaker of the second wireless headphone 102(2). The wireless headphones 102 may be synched together such that the sound outputted at each wireless headphone sounds the same to the user 100.

In some instances, the second communication channel 110 may include near field magnetic induction (NFMI), which enables wireless audio streaming and data transmission using near field magnetic induction in that a modulated signal is transmitted using a transmitter coil in the form of a magnetic field. This magnetic field induces a voltage on the receiving coil, which in turn will be measured by an NFMI receiver. In some instances, NFMI operates in short distances such as less than two meters. In some conventional systems, such as radio frequency (RF) systems, the transmission energy radiates into free space. Comparatively, NFMI, which is a low power frequency system, is designed to contain transmission energy within the localized magnetic field such that the magnetic field energy resonates around the transmitter coil but does not radiate into free space. Because the signal is not transmitted outside of the magnetic field, NFMI is a secure form of wireless communication. Additionally, the magnetic field is undetectable by Bluetooth and/or WiFi systems and does not cause electromagnetic interference (EMI) in nearby electronics. Employing NFMI technology may be particularly useful with the wireless headphones 102 given that an NFMI signal can penetrate through human body tissue with low absorption rate and is a reliable, secure, and power efficient form of wireless communication.

Further, in some instances, processor(s) of the wireless headphones 102 may be configured to account for a latency in transmission between the first wireless headphone 102(1) and the second wireless headphone 102(2). That is, as the first wireless headphone 102(1) receives the audio data 108 before the second wireless headphone 102(2) receives the audio data 108, there may be a lag in sound outputted between the wireless headphones 102. The first wireless headphone 102(1), however, may account for this latency and delay output of the audio data 108 at the first wireless headphone 102(1) such that audio outputted by both wireless headphones 102 is consistent.

From time to time, the user 100 may change settings of the wireless headphones 102 or cause certain commands to be performed. For instance, the user 100 may lower a volume of the song or alternatively, the user 100 may pause the song. In the first instance, the user 100 may lower the volume using at least one of the mobile device 104 or the wireless headphones 102 (e.g., either the first wireless headphone 102(1) or the second wireless headphone 102(2)). If the user 100 lowers the volume using the mobile device 104, the first wireless headphone 102(1) may receive setting(s) 112 to lower the volume of the song at the first wireless headphone 102(1). The setting(s) 112 may be transmitted and/or received via the first communication channel 106. The first wireless headphone 102(1) then transmits, using a third communication channel 114, the setting(s) 112 (or an indication thereof) to the second wireless headphone 102(2). In some instances, the third communication channel 114 may include Bluetooth Low Energy (BLE), ANT, Thread, Bluetooth, WiFi, or the like. Upon being configured according to the setting(s) 112, the second wireless headphone 102(2) may transmit, via the third communication channel 114, an indication 116 that the second wireless headphone 102(2) has been configured according to the setting(s) 112.

As noted above, a latency in transmission between the wireless headphones 102 may be accounted for. For example, the first wireless headphone 102(1) may delay updating to the setting(s) 112, or delay instituting the setting(s) 112 until receiving the indication 116 from the second wireless headphone 102(2). As a result, the sound outputted by the wireless headphones 102 are synched.

Additionally, or alternatively, the setting(s) 112 may be received at one of the wireless headphones 102 through an interaction by the user 100. For instance, the user 100 may press a button on the wireless headphones 102, the headphones 102 may detect a voice command issued by the user 100, or the wireless headphones 102 may include other sensor(s) that detect input from the user 100. In these instances, the wireless headphones 102 may communicate the setting(s) 112, and the indication 116, using the third communication channel 114. For instance, if the second wireless headphone 102(2) receives the interaction by the user 100 (e.g., touch input sensed at a capacitive touch interface to lower the volume), the second wireless headphone 102(2) configures according to the setting(s) 112 and transmits the setting(s) 112 (or an indication thereof) to the first wireless headphone 102(1). The first wireless headphone 102(1) then configures according to the setting(s) 112 and transmits the indication 116 to the second wireless headphone 102(2) via the third communication channel 114.

As it pertains to a command, or setting(s) associated with the command, performance of the command may cause the wireless headphones 102 to perform certain actions or configure to certain setting(s). For instance, commands may include answering a phone call received at the mobile device 104 using the wireless headphones 102, pausing a song being played by the wireless headphones 102, skipping a song being played at the wireless headphones 102, or a pass-through command that configures the wireless headphones to cancel ambient noise (e.g., noise cancellation). In these instances, the commands may be received at the mobile device 104, the first wireless headphone 102(1), and/or the second wireless headphone 102(2). As an example, the user 100 may answer an incoming phone call using the mobile device 104 or may answer the incoming phone call using an interaction (e.g., touch or voice input) at the first wireless headphone 102(1) and/or the second wireless headphone 102(2). Instituting the command, such as answering the phone call, may cause certain actions to be performed or configure the wireless headphones 102 to certain setting(s). For instance, if the wireless headphones 102 are outputting a song and the user 100 answers a phone call, the wireless headphones 102 may output audio data related to the phone call. For instance, the audio data 108 transmitted to the first wireless headphone 102(1) may include audio data related to the phone call. In some instances, transmission of the audio data 108 associated with the phone call may cause the song being played to be paused (e.g., ceasing to be output). That is, as a result of answering the incoming phone call, the wireless headphones 102 output the audio data 108 corresponding to the incoming phone call rather than the audio data 108 corresponding to the song.

As it relates to the pass-through command, in some instances, the wireless headphones 102 may include a first microphone directed towards the ear canal and a second microphone directed outward in an opposite direction as the first microphone. The first microphone may capture sound originating from the ear canal (e.g., humming, coughing, clearing through, etc.) while the second microphone captures sound originating from an environment outside the ear canal. The wireless headphones 102 may use the first microphone to generate a first audio signal representing sound emitted largely through the ear canal when the user speaks, and use the second microphone to generate a second audio signal representing sound from the exterior environment of the ear of the user. In some examples, the wireless headphones 102 may utilize acoustic isolation between the first microphone and the second microphone to prevent the microphones from capturing primarily the same sound waves. By acoustically isolating the first microphone and the second microphone, the first microphone may represent sounds that were emitted by the user 100, such as a voice command.

Moreover, the second microphone may be used to cancel ambient noise from the environment of the user 100 through generating a noise-cancelling wave that is 180° out of phase with the ambient noise. The wireless headphones 102 may include passive acoustic isolation between the microphones (e.g., acoustic blocking material, such as foam, to fill the user's ear canal, headphones which encapsulate the whole user's ear, etc.) and/or active acoustic isolation.

Additionally, the microphone(s) of the wireless headphones 102 may capture user speech during the phone call and transmit audio data associated with the user speech to the mobile device 104. In some instances, the audio data associated with the user speech may be transmitted between the first wireless headphone 102(1) and the second wireless headphone 102(2) via the second communication channel.

In some instances, as the first wireless headphone 102(1) and the second wireless headphone 102(2) may be indistinguishable, the user 100 may conduct an out-of-box experience (OOBE) with the wireless headphones 102 to associate the mobile device 104 with the wireless headphones 102. The OOBE may also configure one of the wireless headphones 102 as the first wireless headphone 102(1) and another of the wireless headphones 102 as the second wireless headphone 102(2). In some instances, the first wireless headphone 102(1) may be considered a primary wireless headphone as it receives the audio data 108 and the setting(s) 112 from the mobile device 104, while the second wireless headphone 102(2) may be considered a secondary wireless headphone.

Figure 2:
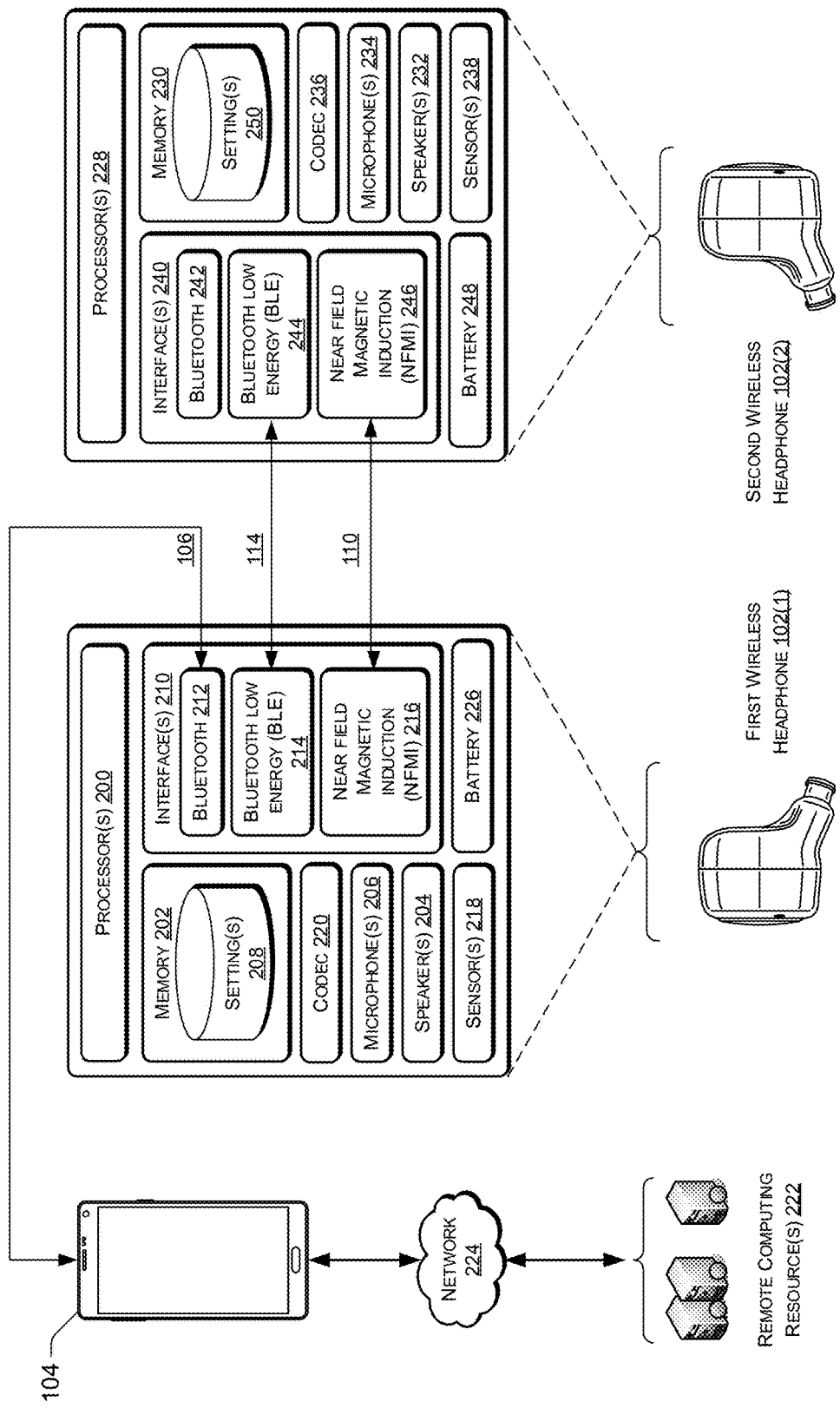
FIG. 2 illustrates a functional block diagram of example wireless headphones, as well as communication channels between the wireless headphones and between one of the wireless headphones and an electronic device.

FIG. 2 illustrates selected functional components of the first wireless headphone 102(1), the second wireless headphone 102(2), and the mobile device 104. The first wireless headphone 102(1) may include processor(s) 200, memory 202, speaker(s) 204, and microphone(s) 206. As illustrated, the first wireless headphone 102(1) includes the memory 202, which stores or otherwise has access to setting(s) 208. In some instances, the setting(s) 208 may relate to setting(s) of the first wireless headphone 102(1) and may be configurable by the user 100. For instance, the setting(s) 208 may relate a volume (e.g., increasing, decreasing, muting, etc.) of audio outputted by the speaker(s) 204, setting of audio (e.g., bass, treble, etc.), ceasing output of audio by the speaker(s) 204, resuming audio outputted by the speaker(s) 204, a pass-through command to capture ambient noise and perform noise canceling, or setting(s) related to phone calls using the microphone(s) 206 (e.g., answering, hanging up, holding, resuming, talking, etc.). In some instances, a request to update the setting(s) 208 may be received from the first wireless headphone 102(1), the second wireless headphone 102(2), and/or the mobile device 104.

FIG. 2 illustrates that the first wireless headphone 102(1) may include several interface(s) 210 to communicatively couple to the second wireless headphone 102(2) and/or the mobile device 104. For instance, the interface(s) 210 may include a Bluetooth interface 212, a Bluetooth Low Energy (BLE) interface 214, and/or a NFMI interface 216. In some instances, the first wireless headphone 102(1) may communicatively couple to the mobile device 104 using the Bluetooth interface 212 and via the first communication channel 106, may communicatively couple to the second wireless headphone 102(2) using the NFMI interface 216 and via the second communication channel 110, and/or may communicatively couple to the second wireless headphone 102(2) using the BLE interface 214 and via the third communication channel 114.

The first wireless headphone 102(1) may receive audio data to be output by the speaker(s) 204. Additionally, the first wireless headphone 102(1) may receive the setting(s) 208, or a request to update the setting(s) 208, from at least one of the second wireless headphone 102(2) and/or the mobile device 104. In response, the processor(s) 200 of the first wireless headphone 102(1) may configure the first wireless headphone 102(1) according to the setting(s) 208.

The setting(s) 208, or the request to update the setting(s) 208, may be received by sensor(s) 218 of the first wireless headphone 102(1). By way of non-limiting examples, the sensor(s) 218 may include accelerometers, capacitive touch sensors, buttons, motion sensors, and so forth. The sensor(s) 218 are capable of receiving and/or detecting input from the user 100. For example, to increase the volume of the audio output by the speaker(s) 204, the user 100 may tap (e.g., touch) the first wireless headphone 102(1). The sensor(s) 218 may detect this touch, whether by an accelerometer or by capacitive touch sensor, and the processor(s) 200 may determine a command associated with the touch (e.g., increasing the volume).

Additionally, or alternatively, the first wireless headphone 102(1) may include the microphone(s) 206 to detect input from the user 100. For instance, the microphone(s) 206 may receive audio input, such as sound uttered by the user 100. A codec 220 is coupled to the microphone(s) 206 to encode the audio signals. The codec 220 may also convert audio data between analog and digital formats. For instance, the user 100 may interact with the first wireless headphone 102(1) by speaking and the microphone(s) 206 capture the user speech. Therein, the codec 220 encodes the user speech and transfers the audio data to other components. The codec 220 is also coupled to the speaker(s) 204 to decode the audio signals.

The microphone(s) 206 may be capture sound user speech during a phone call and may generate audio data representing the speech. The audio data may then be transmitted to the mobile device 104, which may send the audio data to another device associated with the phone call.

In some instances, the first wireless headphone 102(1) may operate in conjunction with or may otherwise utilize computing resource(s) 222 that are remote from the wireless headphones 102. For instance, the first wireless headphone 102(1) may communicatively couple to the remote computing resource(s) 222 over a network 224 and via the mobile device 104. For instance, the mobile device 104 may serve as an interface between the remote computing resource(s) 222 and the wireless headphones 102. In this way, more intensive processing used for speech processing may be performed using large amounts of resources at the remote computing resources(s) 222.

For instance, the speech of the user 100 may be analyzed to determine that the user 100 is requesting that the wireless headphones 102 stream music, control a secondary device (e.g., turn on a TV, conduct a phone call using a cell phone, etc.), perform a phone call using the mobile device 104, and so forth. Speech-recognition component(s) of the remote computing resource(s) 222, for instance, may then relay the command (or setting(s)) to the first wireless headphone 102(1) and/or the mobile device 104).

The mobile device 104 may communicatively couple to the network 224 using wireless technologies (e.g., RF, cellular, satellite, Bluetooth, etc.), or other connection technologies. In this sense, the mobile device 104 may communicatively couple the first wireless headphone 102(1) to the remote computing resource(s) 222. However, in some instances, the first wireless headphone 102(1) may communicatively couple to the remote computing resource(s) 222 without utilizing the mobile device 104. For instance, the interface(s) 210 may additionally, or alternatively include a cellular, RF, or satellite interface to couple to the remote computing resource(s) 222.

The remote computing resource(s) 222 may be implemented as one or more servers and may, in some instances form a portion of a network-accessible computing platform implemented as a computing infrastructure of processors, storage, software, data access, and so forth that is maintained and accessible via a network such as the Internet. Common expressions associated for these remote computing resource(s) 222 include "on-demand computing", "software as a service (SaaS)", "platform computing", "network-accessible platform", "cloud services", "data centers", and so forth. The remote computing resource(s) 222 may include processor(s) and memory that have access to and utilize the speech recognition engines for receiving audio signals from the first wireless headphone 102(1), recognizing speech and, potentially, causing performance of an action in response. In some examples, the first wireless headphone 102(1) may upload audio data to the remote computing resource(s) 222 for processing, given that the remote computing resource(s) 222 may have a computational capacity that far exceeds the computational capacity of the first wireless headphone 102 (1). Therefore, the first wireless headphone 102(1) may utilize the speech-recognition engine at the remote computing resource(s) 222 for performing relatively complex analysis on audio captured at the first wireless headphone 102(1) and/or the second wireless headphone 102(2). For instance, the user 100 may utter a command, such as "Please increase the volume." This command may be transmitted to the remote computing resource(s) 222 for analysis and thereafter the wireless headphones 102 may increase the volume of the song. However, the user 100 may also utter other commands, such as "I'd like to go to a movie. Please tell me what's playing at the local cinema." The remote computing resource(s) 222 may analyze the speech, perform certain actions (e.g., determine what's playing at local cinemas), generate a response, and transmit the response to the wireless headphones 102 for output. Regardless, the commands may be for essentially type of operation, such as database inquires, requesting and consuming entertainment (e.g., gaming, finding and playing music, movies or other content, etc.), personal management (e.g., calendaring, note taking, etc.), online shopping, financial transactions, and so forth.

A battery 226 is further provided to distribute power to the various components of the first wireless headphone 102(1).

The second wireless headphone 102(2) may include similar components as the first wireless headphone 102(1), such as processor(s) 228, memory 230, speaker(s) 232, microphone(s) 234, a codec 236, sensor(s) 238, and interface(s) 240 including a Bluetooth interface 242, a BLE interface 244, and a NFMI interface 246. The second wireless headphone 102(2) may also include a battery 248 and setting(s) 250 stored in the memory 230.

In some instances, the second wireless headphone 102(2) may perform similar functions as the first wireless headphone 102(1), such as detecting user speech and may be configured to communicatively couple to the remote computing resource(s) 222, whether indirectly (e.g., via the mobile device 104 and/or the first wireless headphone 102(1)) or directly (e.g., via the network 224).

FIG. 2 also illustrates that the BLE interface 214 may communicate with the BLE interface 244 to form the third communication channel 114 for sending requests to update the setting(s) (e.g., the setting(s) 208, the setting(s) 250). The NFMI interface 216 may similarly communicate with the NFMI interface 246 to form the second communication channel 110 for sending audio data corresponding to music or a phone call to be output by speaker(s) (e.g., the speaker(s) 204, the speaker(s) 232).

As used herein, a processor, such as processor(s) 200, 228, and/or the processor(s) of the remote computing resource(s) 222 may include multiple processors and/or a processor having multiple cores. Further, the processor(s) may comprise one or more cores of different types. For example, the processor(s) may include application processor units, graphic processing units, and so forth. In one implementation, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

The memory 202, 230, and/or the memory of the remote computing resource(s) 222 may include volatile and non-volatile memory, removable and non-removable media implemented in any method or technology for storage of information, such as computer-readable instructions, data structures, program component, or other data. Such memory may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

FIGS. 3-12 illustrate various processes related to maintaining consistent audio setting between wireless headphones. The processes described herein are illustrated as collections of blocks in logical flow diagrams, which represent a sequence of operations, some or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1 and 2, although the processes may be implemented in a wide variety of other environments, architectures and systems.

Figure 3:
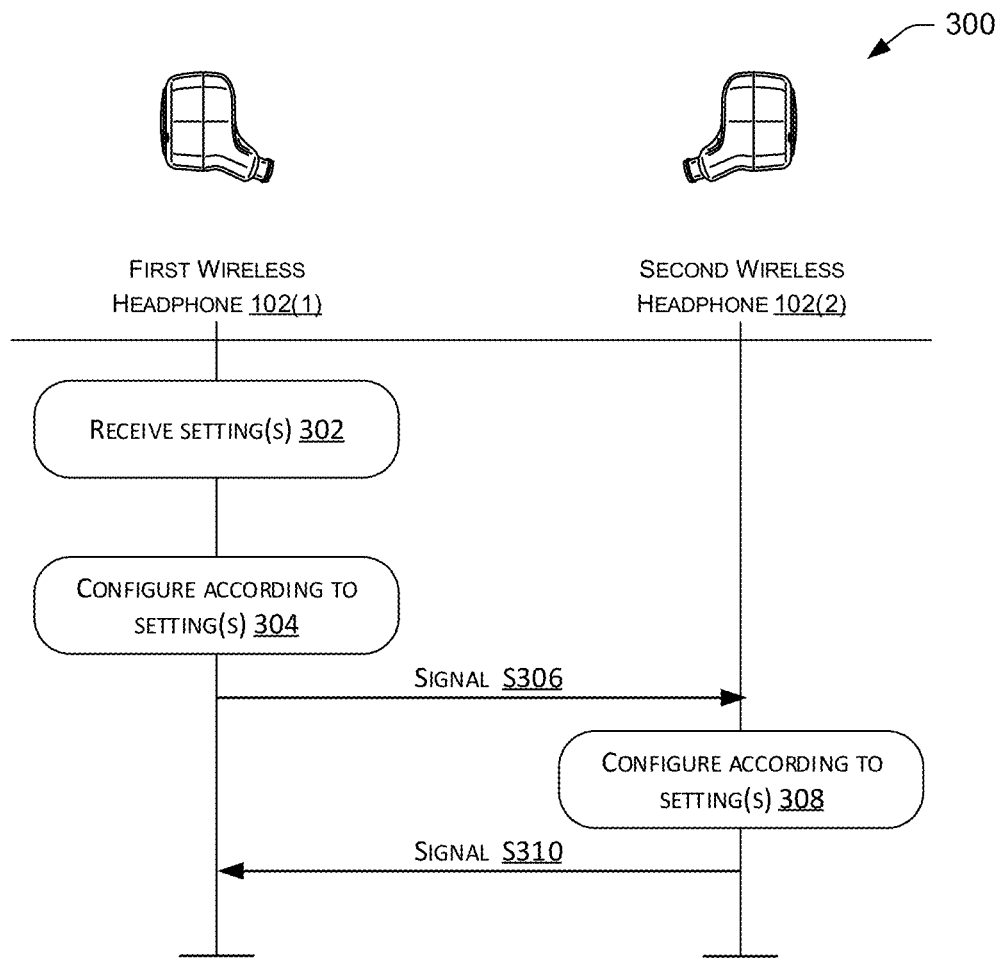
FIG. 3 illustrates a first example signal diagram for configuring wireless headphones according to a received audio setting. In this example, a first wireless headphone receives a setting is and relays the setting to a second headphone.

FIG. 3 illustrates a signal diagram of an example process 300 configuring a first wireless headphone 102(1) and a second wireless headphone 102(2) according to a received audio setting. The process 300, may receive, at 302, setting(s) to configure wireless headphones 102. For instance, the setting(s) may be received from a user interaction on or at one of the wireless headphones or on or at the mobile device 104 operated by a user 100. In the latter instances, receiving the setting(s) may include the first wireless headphone 102(1) receiving a signal from the mobile device over the first communication channel 106. The setting(s) may relate to various commands issued by the user 100, such as lowering a volume of music audio data being played by the wireless headphones 102.

The process 300, may configure, at 304, the first wireless headphone 102(1) according to the setting(s). For instance, the first wireless headphone 102(1) may receive the setting(s), and in response, configure the first wireless headphone 102(1) according to the setting(s). The setting(s) may cause the wireless headphone 102(1) to configure to certain setting(s), update certain setting(s), or otherwise perform certain actions.

After, during, or before configuring the first wireless headphone 102(1), the process 300, at signal S306, may transmit a signal to the second wireless headphone 102(2). For instance, after, during, or before configuring the first wireless headphone 102(1) according to the setting(s), the first wireless headphone 102(1) may transmit, using the third communication channel 114, the setting(s) to the second wireless headphone 102(2). In some instances, the first wireless headphone 102(1) may first configure the first wireless headphone 102(1) and thereafter transmit the signal S306 to the second wireless headphone 102(2). For instance, after transmitting the setting(s), the first wireless headphone 102(1) may be configured.

The process 300, may configure, at 308 the second wireless headphone 102(2) according to the setting(s). For instance, upon receiving the signal S306, the second wireless headphone 102(2) may configure the second wireless headphone 102(2) according to the setting(s).

The process 300, at signal S310, may transmit a signal to the first wireless headphone 102(1). For instance, the second wireless headphone 102(2) may transmit, using the third communication channel 114, the signal S310 to the first wireless headphone 102(1). The signal S310 may be an indication that the second wireless headphone 102(2) is configured according to the setting(s).

Figure 4:
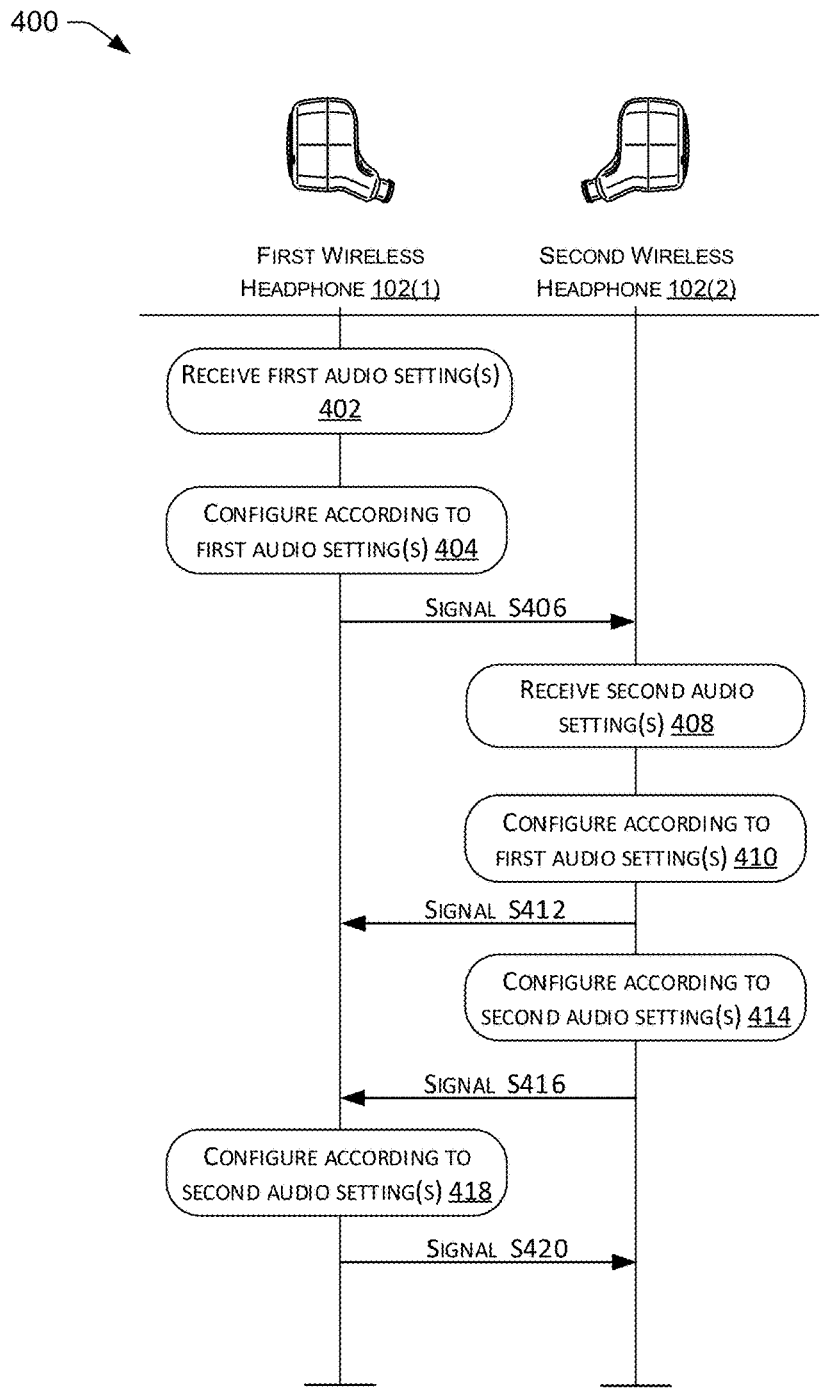
FIG. 4 illustrates a second example signal diagram for configuring wireless headphones according to a received audio setting. In this example, a first wireless receives a first setting and relays it to a second wireless headphone. Thereafter, the second headphone receives a second setting and relays it to the first headphone.

FIG. 4 illustrates a signal diagram of an example process 400 configuring a first wireless headphone 102(1) and a second wireless headphone 102(2) according to setting(s). The process 400, at 402 may include receiving first audio setting(s) 402 from a user interaction of a user 100. For instance, the first wireless headphone 102(1) may receive setting(s) (or an instruction according to setting(s)) from a mobile device 104 operated by the user 100.

The process 400, at 404 may configure the first wireless headphone 102(1) according to the first audio setting(s). For instance, the first wireless headphone 102(1) may configure the first wireless headphone 102(1) to lower a volume of music audio data or to lower the volume of the music audio data to a certain volume level.

The process 400, at signal S406 may transmit a signal to the second wireless headphone 102(2). The signal S406 may be transmitted by the first wireless headphone 102(1) to the second wireless headphone 102(2) using the third communication channel 114. The signal S416 may be or represent a request for the second wireless headphone 102(2) to configure according to the first audio setting(s).

The process 400, at 408 may receive second audio setting(s) from a user interaction. In some instances, the user interaction according to the second audio setting(s) may be received at the second wireless headphone 102(2), such as the user 100 issuing a touch input (e.g., tap, double tap, etc.) at the second wireless headphone 102(2). This touch input may be received or detected via one or more sensors (e.g., the sensor(s) 238).

The process 400, at 410 may configure the second wireless headphone 102(2) according to the first audio setting(s). For instance, the second wireless headphone 102(2) may configure the second wireless headphone 102(2) to lower a volume of the music audio data or to lower the volume of the music audio data to a certain volume level. That is, rather than configuring the second wireless headphone 102(2) according to the second audio setting(s), the second wireless headphone 102(2) may queue the second audio setting(s) until after the second wireless headphone 102(2) configures according to the first audio setting(s). The second wireless headphone 102(2) may detect a conflict between the first audio setting(s) (e.g., to lower the volume) and the second audio setting(s) (e.g., to increase the volume) and to maintain consistent audio setting(s) between the wireless headphones 102, the second wireless headphone 102(2) may configure according to the first audio setting(s). As noted above, the second wireless headphone 102(2) may be a secondary wireless headphone and the first wireless headphone 102(1) may be a primary wireless headphone. In this sense, the second wireless headphone 102(2) may yield to the first audio setting(s) despite that the second wireless headphone 102(2) receiving second audio setting(s).

The process 400, at signal S412 may transmit a signal to the first wireless headphone 102(1). For instance, after configuring the second wireless headphone 102(2) according the first audio setting(s), the second wireless headphone 102(2) may transmit, using the third communication channel 114, the signal S412 indicating that the second wireless headphone 102(2) is configured according to the first audio setting(s).

The process 400, at 414 may configure the second wireless headphone 102(2) according to the second setting(s). That is, the second wireless headphone 102(2) may configure the second wireless headphone 102(2) to increase the volume or to increase the volume of the music audio data to a certain volume level.

The process 400, at signal S416 may transmit a signal to the first wireless headphone 102(1). The signal S416 may be transmitted by the second wireless headphone 102(2) to the first wireless headphone 102(1) using the third communication channel 114. The signal S416 may be a request (or indication/instruction) for the first wireless headphone 102 (1) to configure according to the second audio setting(s).

The process 400, at 418 may configure the first wireless headphone 102(1) according to the second audio setting(s). That is, the first wireless headphone 102(1) may configure the first wireless headphone 102(1) to increase the volume or to increase the volume of the music audio data to a certain volume level.

The process 400, at signal S420 may transmit a signal to the second wireless headphone 102(2). For instance, in configuring the first wireless headphone 102(1) according the second audio setting(s), the first wireless headphone 102(1) may transmit, using the third communication channel 114, the signal S420 indicating that the first wireless headphone 102(1) is configured according to the second audio setting(s).

Accordingly, the process 400 illustrates that the wireless headphones 102 may be configured according to consistent audio settings in instances where conflicting audio setting(s) are received by the first wireless headphone 102(1) and the second wireless headphone 102(2) respectively. That is, the first wireless headphone 102(1) may receive, during a first period of time, the first audio setting(s) and update accordingly to the first audio setting(s) at a second period of time. However, before receiving an indication that the second wireless headphone 102(2) is configured according to the first audio setting(s), the second wireless headphone 102(2) may receive, during a third period of time that is after the second period of time the second audio setting(s). However, as noted above, in some instances, the first wireless headphone 102(1) may delay updating to the first audio setting(s), or implementing the first audio setting(s) until receiving an indication from the second wireless headphone 102(1), therein allowing the wireless headphones 102 to output consistent updated setting(s). In some instances, the second wireless headphone 102(2) may yield to the first audio setting(s) and configure the second wireless headphone 102(2) during a fourth period of time that is after the third period of time. In other words, before the second wireless headphone 102(2) is able to configure according to the first audio setting(s), the second wireless headphone 102(2) receives the second audio setting(s). Therein, during a fifth period of time, the second wireless headphone 102(2) may configure to the second audio setting(s), and at a sixth period of time, the second wireless headphone 102(2) may transmit the signal S414 to the first wireless headphone 102(1).

Moreover, in some instances, during or after transmitting the signal S406, the first wireless headphone 102(1) may be unable to accept audio setting(s) from the second wireless headphone 102(2) and/or the mobile device 104. Additionally, or alternatively, the first wireless headphone 102(1) may "lock" its setting(s) (e.g., the setting(s) 208) such that the setting(s) are not capable of being updated. That is, the first wireless headphone 102(1) may not accept or receive the second audio setting(s). Instead, the second audio setting(s) are queued at the second wireless headphone 102(2). In some instances, the first wireless headphone 102(1) may be unable to receive the second audio setting(s), or "unlock" so as to permit the receipt of the second audio setting(s) until receiving the signal S414 that the second wireless headphone 102(2) is configured according to the first audio setting(s).

Additionally, the process 400 further illustrates that the roles of the wireless headphones 102 are reversed, as compared to the process 300 of FIG. 3. That is, the second wireless headphone 102(2) may transmit commands, requests, or instructions for the first wireless headphone 102(1) to configure according to setting(s).

Figure 5:
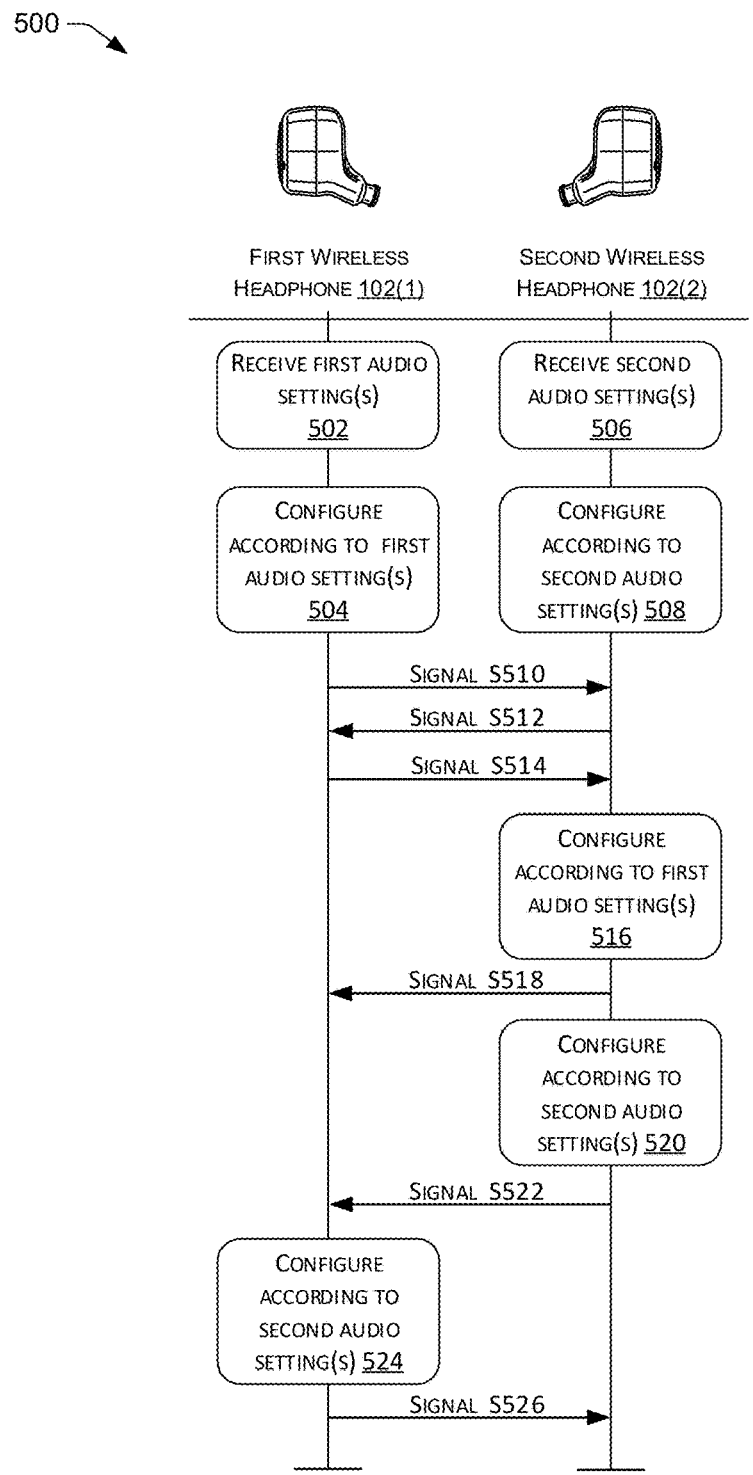
FIG. 5 illustrates a third example signal diagram for configuring wireless headphones according to a received audio setting. In this example, both the first and second wireless headphones receive audio settings substantially contemporaneously and, thus, each headphone implements a protocol for handling this race condition.

FIG. 5 illustrates a signal diagram of an example process 500 to configure a first wireless headphone 102(1) and a second wireless headphone 102(2) according to setting(s). The process 500, at 502 may receive first audio setting(s). For instance, a user 100 may interact with a mobile device 104 to increase the volume of audio data being outputted by the wireless headphones 102 and a signal may be received by the first wireless headphone 102(1), indicating the first audio setting(s) or an instruction relating to the first audio setting(s).

The process 500, at 504 may configure the first wireless headphone 102(1) according to the first audio setting(s).

The process 500, at 506 may receive second audio setting(s) from a user interaction of the user 100. For instance, the user 100 may interact with a second wireless headphone 102(2) to decrease the volume of the audio data being outputted by the wireless headphones 102 and a signal may be received by the second wireless headphone 102(2), indicating the second audio setting(s) for which to update to, or an instruction relating to the second audio setting(s).

The process 500, at 508 may configure the second wireless headphone 102(2) according to the second audio setting(s).

The process 500, at signal S510 may transmit a signal to the second wireless headphone 102(2). The signal S510 may be transmitted by the first wireless headphone 102(1) to the second wireless headphone 102(2) using the third communication channel 114 and may be a request for the second wireless headphone 102(2) to configure according to the first audio setting(s).

The process 500, at signal S512 may transmit a signal to the first wireless headphone 102(1). The signal S512 may be transmitted by the second wireless headphone 102(2) to the second wireless headphone 102(2) using the third communication channel 114 and may be a request for the first wireless headphone 102(1) to configure according to the second audio setting(s).

With the receipt of the signal S512, the first wireless headphone 102(1) may detect a "race" condition. More particularly, the first audio setting(s) may be received during a first period of time and the second audio setting(s) may be received during a second period of time. The first period of time and the second period of time may be substantially contemporaneous. In this sense, each of the wireless headphones 102 may receive conflicting audio setting(s), as compared to one another, in which to configure the wireless headphones 102. However, although the above has been described, in some instances, the process 500 may receive the second audio setting(s) prior to the first audio setting(s). In these instances, configuring the wireless headphones 102 according to the requests would yield inconsistent audio setting(s) between the wireless headphones 102. For example, the first wireless headphone 102(1) would configure according to the second audio setting(s) and the second wireless headphone 102(2) would configure according to the first audio setting(s). However, here, the first wireless headphone 102(1) detects the race condition and the process 500, at signal S514 transmits an indication to the second wireless headphone 102(2) indicating that the first wireless headphone 102(1) received the second audio setting(s) (or an indication thereof) but the first wireless headphone 102(1) does not configure according to the second audio setting(s).

The process 500, at 516 may configure the second wireless headphone 102(2) according to the first audio setting(s). In other words, at 516, the second wireless headphone 102(2) may yield to the request transmitted by the first wireless headphone 102(1) (e.g., the signal S510) to configure according to the first audio setting(s). In some instances, the signal S514 may be received by the first wireless headphone 102(1) at a third period of time.

The process 500, at signal S518 may transmit a signal to the first wireless headphone 102(1). For instance, upon configuring the second wireless headphone 102(2) according the first audio setting(s), the second wireless headphone 102(2) may transmit, using the third communication channel 114, the signal S518 indicating that the second wireless headphone 102(2) is configured according to the first audio setting(s).

The process 500, at 520 may configure the second wireless headphone 102(2) according to the second audio setting(s). Note that the process 500 configures the second wireless headphone 102(2) according to the second audio setting(s) based at least in part on the second audio setting(s) being received after the first audio setting(s). That is, the second audio setting(s) may represent a more recent user interaction of the user 100 requesting a change in the audio setting(s) of the wireless headphones 102. At 520, the second audio setting(s) may be configured during a fourth period of time.

The process 500, at signal S522 may transmit a signal to the first wireless headphone 102(1). For instance, in configuring the second wireless headphone 102(2) according the second audio setting(s), the second wireless headphone 102(2) may transmit, using the third communication channel 114, the signal S522 requesting for the first wireless headphone 102(1) to configure according to the second audio setting(s).

The process 500, at 524 may configure the first wireless headphone 102(1) according to the second audio setting(s). The configuration at 524 may occur during a fifth period of time.

The process 500, at signal S526 may transmit a signal to the second wireless headphone 102(2). For instance, in configuring the first wireless headphone 102(1) according the second audio setting(s), the first wireless headphone 102(1) may transmit, using the third communication channel 114, the signal S526 indicating that the first wireless headphone 102(1) is configured according to the second audio setting(s).

Accordingly, as a result of the process 500, the wireless headphones 102 may be configured according to consistent audio setting(s) despite receiving conflicting audio setting(s) close in time. In other words, before the second wireless headphone 102(2) configures according to audio setting(s) (e.g., the first audio setting(s)), the second wireless headphone 102(2) may receive other audio setting(s) (e.g., the second audio setting(s)). In such instances, the process 500 may be implemented to ensure that the wireless headphones 102 are configured according to consistent audio setting(s).

As the process 500 illustrates, the second wireless headphone 102(2) first configures according to the second audio setting(s) (e.g., at 508), second configures according to the first audio setting(s) (e.g., at 516), and then third configures according to the second audio setting(s) (e.g., at 520). In some instances, however, the second wireless headphone 102(2) may configure according to the most recent in time audio setting(s). That is, because the second audio setting(s) may, in some instances, be received later in time than the first audio setting(s), the second wireless headphone 102(2) may ignore the first audio setting(s), update according to the second audio setting(s), and then transmit a request for the first wireless headphone 102(1) to update according to the second audio setting(s). In some instances, this may eliminate the need for the second wireless headphone 102(2) configuring to the second audio setting(s) more than once.

Figure 6:
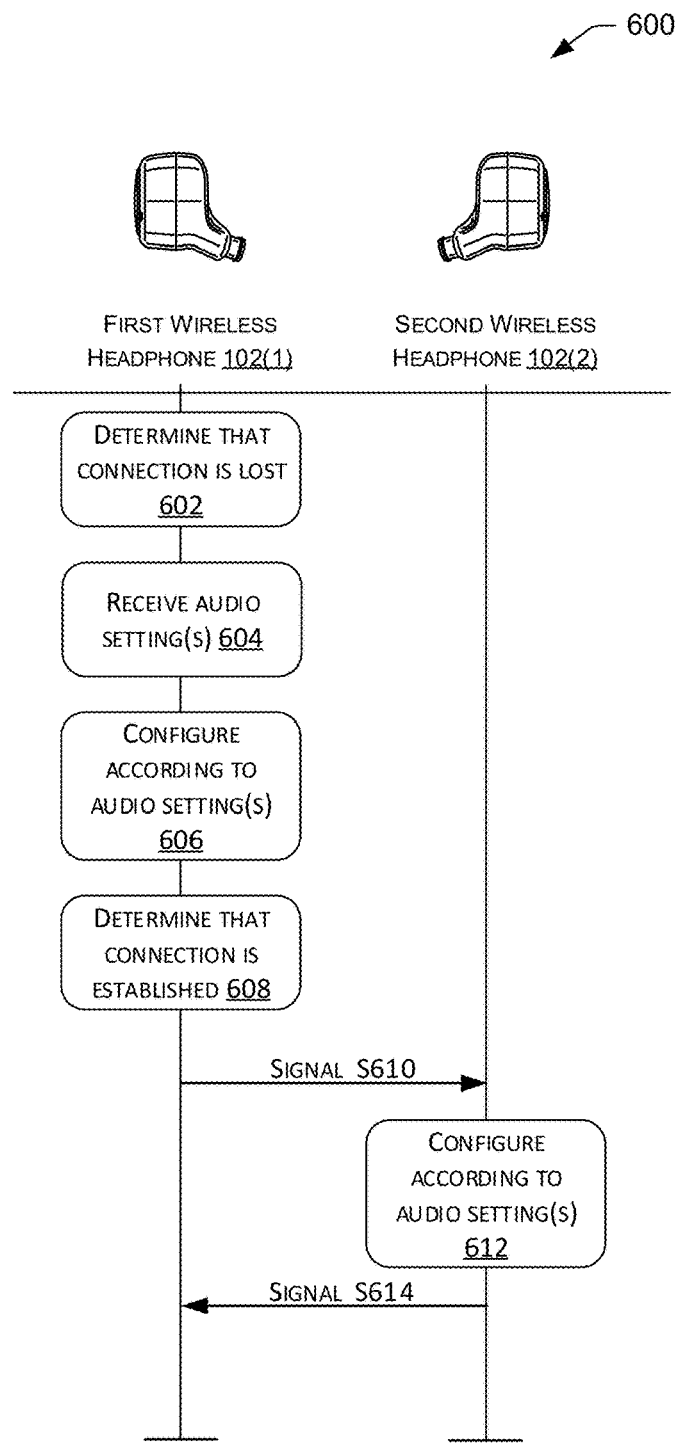
FIG. 6 illustrates a fourth example signal diagram for configuring wireless headphones according to a received audio setting when a connectivity between the wireless headphones is lost and reestablished.

FIG. 6 illustrates a signal diagram of an example process 600 to configure a first wireless headphone 102(1) and a second wireless headphone 102(2) according to setting(s). The process 600, at 602 may determine that a connection between the first wireless headphone 102(1) and the second wireless headphone 102(2) is lost. For instance, the first wireless headphone 102(1) may determine that at least one of the second communication channel 110 or the third communication channel 114 is lost. In some instances, the connection between the wireless headphones 102 may be lost, for instance, because the wireless headphones 102 are not within range of each other.

The process 600, at 604 may receive audio setting(s). The audio setting(s) may be received from a user 100 through a user interaction (e.g., at the first wireless headphone 102(1)). The process 600, at 606 may configure the first wireless headphone 102(1) according to the audio setting(s).

The process 600, at 608 may determine that the connection between the first wireless headphone 102(1) and the second wireless headphone 102(2) is established (or reestablished). For instance, the first wireless headphone 102(1) may determine that at least one of the second communication channel 110 or the third communication channel 114 is established.

The process 600, may transmit a signal S610 to the second wireless headphone 102(2) indicating the audio setting(s). For instance, the first wireless headphone 102(1) may transmit the signal S610 to second wireless headphone 102(2) requesting that the second wireless headphone 102(2) configure according to the audio setting(s). In some instances, transmitting the signal S610 may be based at least in part on the receiving the indication at 608.

The process 600, at 612 may configure the second wireless headphone 102(2) according to the audio setting(s) and may transmit, at signal S614 to the first wireless headphone 102(1) an indication that the second wireless headphone 102(2) is configured.

Figure 7:
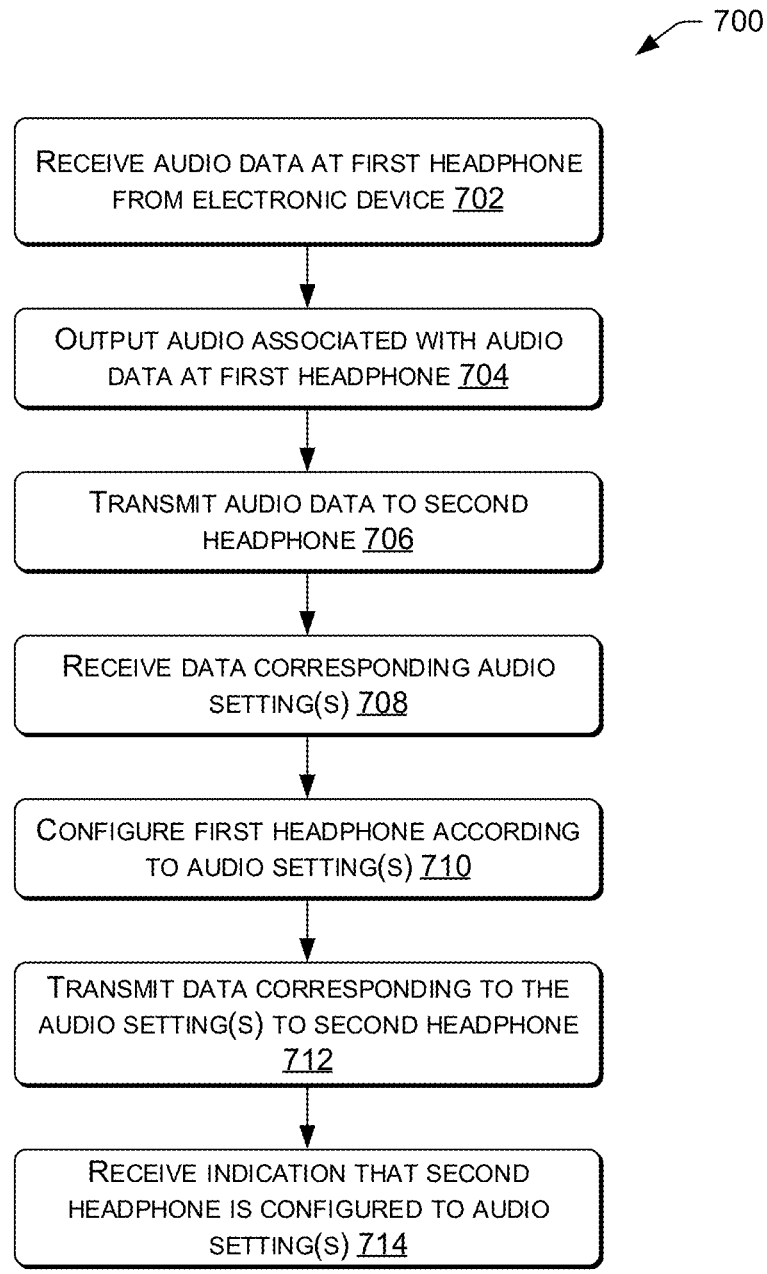
FIGS. 7-12 illustrates respective flow diagrams of example processes for configuring wireless headphones according to received audio settings.

FIG. 7 illustrates an example process 700 to configure wireless headphones according to setting(s). In some instances, the process 700 may be implemented by one or more wireless headphones, such as the first wireless headphone 102(1).

The process 700, at block 702 may receive audio data at a first wireless headphone from an electronic device. For instance, first wireless headphone 102(1) may receive, via a first communication channel 106 from a mobile device 104, audio data (e.g., the audio data 108) to be outputted by wireless headphones 102.

The process 700, at block 704 may output audio associated with the audio data at the first wireless headphone. For instance, the first wireless headphone 102(1) may output audio associated with the audio data via speaker(s) (e.g., the speaker(s) 204).

The process 700, at block 706 may transmit the audio data to a second wireless headphone. For instance, the first wireless headphone 102(1) may transmit, via a second communication channel 110, the audio data (e.g., the audio data 108) to a second wireless headphone 102(2). In some instances, block 704 and block 706 may be performed substantially contemporaneously with one another such that sound outputted by the wireless headphones 102 sounds consistent. Additionally, or alternatively, the first wireless headphone 102(1) may delay outputting the audio to account for a latency in transmitting the audio data to the second wireless headphone 102(2).

The process 700, at block 708 may receive data corresponding to audio setting(s). For instance, the first wireless headphone 102(1) may receive, via the first communication channel 106 from the mobile device 104, data corresponding to the audio setting(s)(e.g., increase volume up/down, increase/decrease volume to certain level, answer phone call, pass-through, etc.). In some instances, the data may include an indication corresponding to the audio setting(s), an instruction, request, command, and so forth. Additionally, or alternatively, the data corresponding to the audio setting(s) may be received at the first wireless headphone 102(1) (e.g., touch, voice, etc.), at the second wireless headphone 102(2) (e.g., touch, voice, etc.), from other electronic devices, or any combination thereof.

The process 700, at block 710 may configure the first wireless headphone according to the audio setting(s).

The process 700, at block 712 may transmit data corresponding to the audio setting(s) to a second wireless headphone. For instance, the first wireless headphone 102(1) may transmit, via a third communication channel 114, the data (e.g., the setting(s) 112) to the second wireless headphone 102(2). In some instances, the data may include an instruction for the second wireless headphone 102(2) to perform (e.g., increase volume to level 5).

The process 700, at block 714 may receive an indication that the second wireless headphone is configured according to the audio setting(s). For instance, the first wireless headphone 102(1) may receive, from the second wireless headphone 102(2), via the third communication channel 114, an indication (e.g., the indication 116) that the second wireless headphone 102(2) is (or has been) configured according to the audio setting(s) (e.g., lowering the volume of the audio data).

Figure 8:
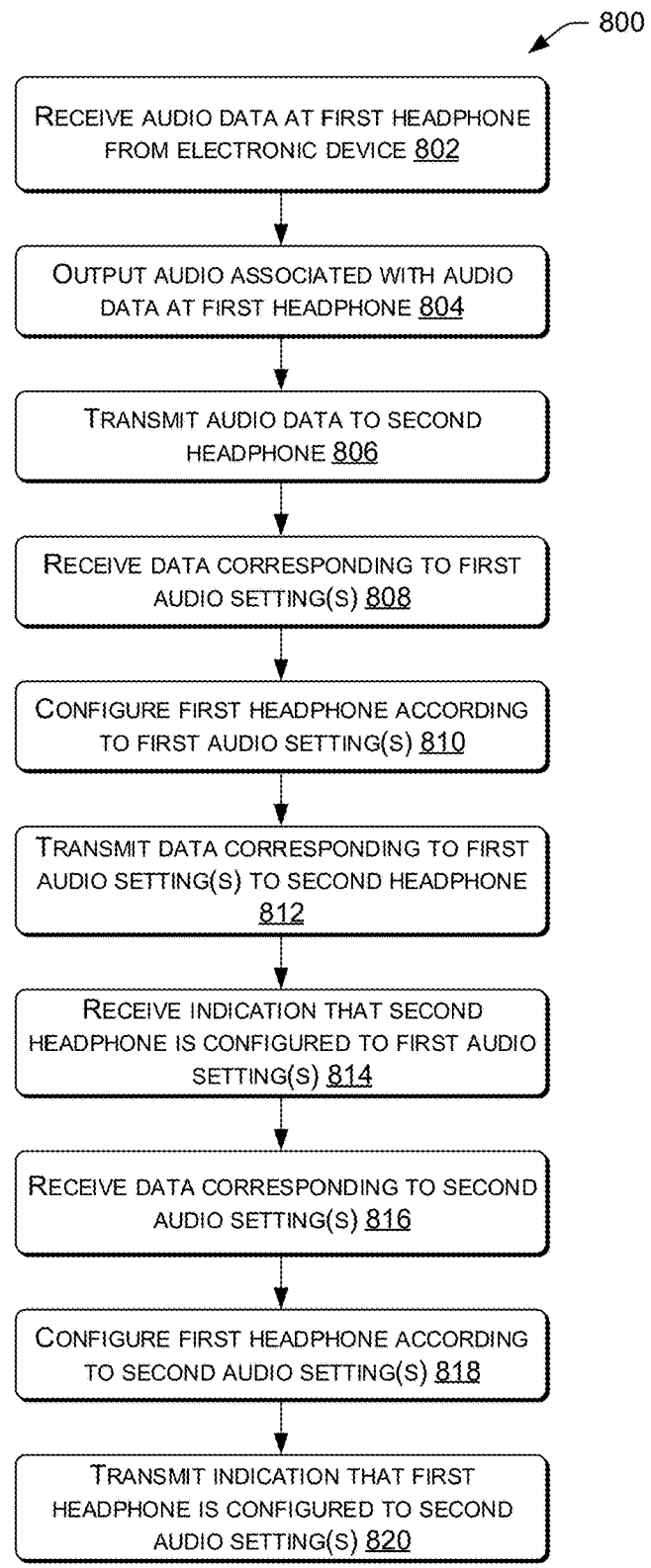

FIG. 8 illustrates an example process 800 to configure wireless headphones according to setting(s). In some instances, the process 800 may be implemented by one or more wireless headphones, such as the first wireless headphone 102(1).

The process 800, at block 802 may receive audio data at a first wireless headphone from an electronic device. For instance, first wireless headphone 102(1) may receive, via a first communication channel 106, audio data to be outputted by wireless headphones 102.

The process 800, at block 804 may output audio associated with the audio data at the first wireless headphone. For instance, the first wireless headphone 102(1) may output audio associated with the audio data at speaker(s) (e.g., the speaker(s) 204).

The process 800, at block 806 may transmit the audio data to a second wireless headphone. For instance, the first wireless headphone 102(1) may transmit, via a second communication channel 110, the audio data to a second wireless headphone 102(2).

The process 800, at block 808 may receive data corresponding to first audio setting(s). For instance, the first wireless headphone 102(1) may receive data indicating the first audio setting(s) from the mobile device 104, at the first wireless headphone 102(1), and/or the second wireless headphone 102(2).

The process 800, at block 810 may configure the first wireless headphone 102(1) according to the first setting(s).

The process 800, at block 812 may transmit data corresponding to the first audio setting(s) to a second wireless headphone. For instance, the first wireless headphone 102(1) may transmit, via a third communication channel 114, data indicating the first setting(s) to the second wireless headphone 102(2).

The process 800, at block 814 may receive an indication that the second wireless headphone is configured according to the first audio setting(s). For instance, the first wireless headphone 102(1) may receive, from the second wireless headphone 102(2), via the third communication channel 114, an indication that the second wireless headphone 102(2) is configured according to the first audio setting(s).

The process 800, at block 816 may receive data corresponding to second audio setting(s). For instance, the first wireless headphone 102(1) may receive, from the second wireless headphone 102(2), data indicating the second audio setting(s) via the third communication channel 114.

The process 800, at block 818 may configure the first wireless headphone according to the second audio setting(s).

The process 800, at block 820 may transmit an indication that the first wireless headphone is configured according to the second audio setting(s). For instance, the first wireless headphone 102(1) may transmit, via the third communication channel 114, an indication to the second wireless headphone 102(2) indicating that the first wireless headphone 102(1) is configured according to the second audio setting(s).

Figure 9:
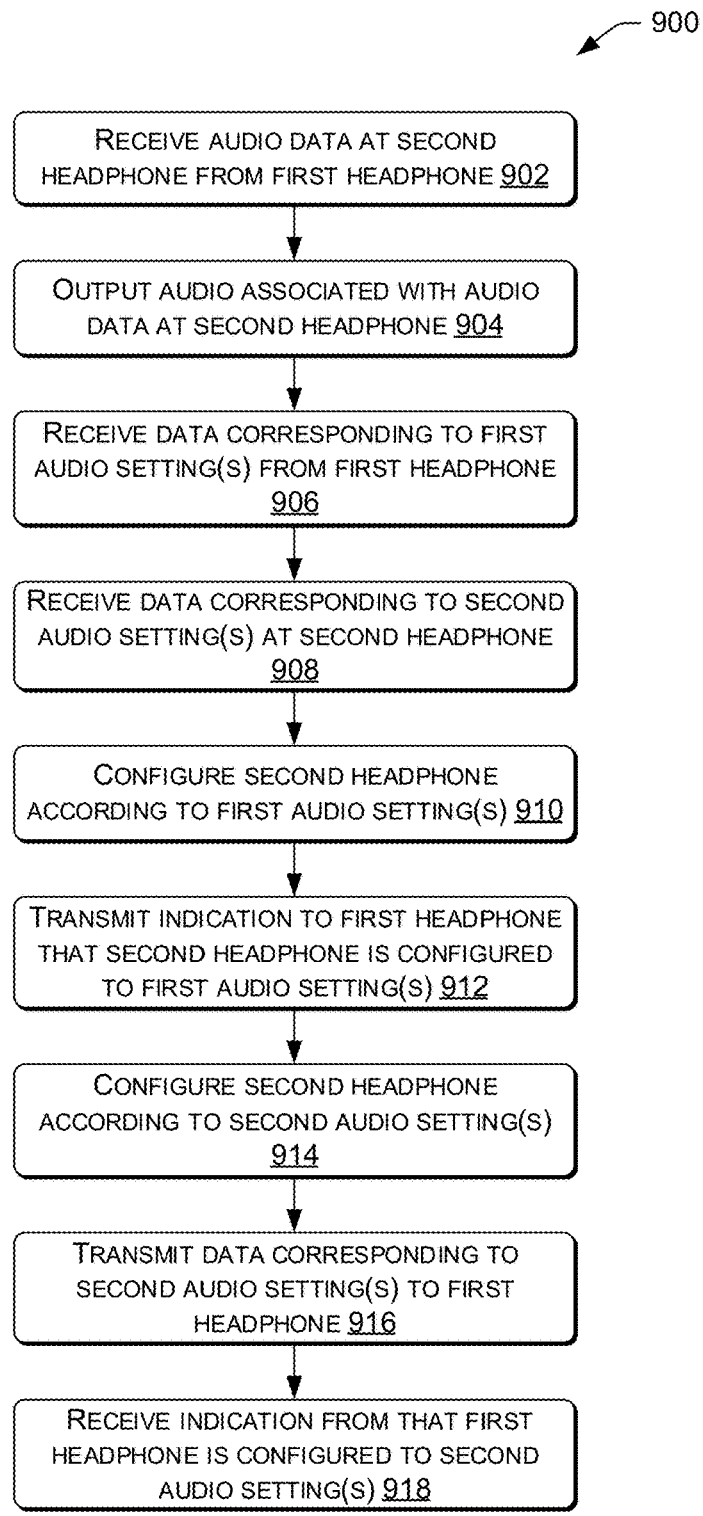

FIG. 9 illustrates an example process 900 to configure wireless headphones according to setting(s). In some instances, the process 900 may be implemented by one or more wireless headphones, such as the second wireless headphone 102(2).

The process 900, at block 902 may receive audio data at a second wireless headphone from a first wireless headphone. For instance, second wireless headphone 102(2) may receive, via a second communication channel 110, audio data from the first wireless headphone 102(1).

The process 900, at block 904 may output audio associated with the audio data at the second wireless headphone 102(2). To maintain a consistent output or factor a latency between the wireless headphones 102, the second wireless headphone 102(2) may output the audio at the same time as the first wireless headphone 102(1).

The process 900, at block 906 may receive data corresponding to first audio setting(s) from the first wireless headphone 102(1). For instance, the second wireless headphone 102(2) may receive data indicating the first audio setting(s) corresponding from the first wireless headphone 102(1) via the third communication channel 114.

The process 900, at block 908 may receive data corresponding to second audio setting(s). For instance, the second wireless headphone 102(2) may receive data indicating the second audio setting(s) at the second wireless headphone 102(2) (e.g., touch, voice, etc.).

The process 900, at block 910 may configure the second wireless headphone 102(2) according to the first audio setting(s).

The process 900, at block 912 may transmit an indication that the second wireless headphone 102(2) is configured according to the first audio setting(s). For instance, the second wireless headphone 102(2) may transmit, to the first wireless headphone 102(1), via the third communication channel 114, an indication that the second wireless headphone 102(2) is configured according to the first audio setting(s). In some instances, the indication may be transmitted based at least in part on the second wireless headphone 102(2) configuring according to the first audio setting(s).

The process 900, at block 914 may configure the second wireless headphone 102(2) according to the second audio setting(s). However, as noted above, in some instances, the process 900 may bypass configuring the second wireless headphone 102(2) according to the first audio setting(s), instead configuring the second wireless headphone 102(2) according to the most recent-in-time audio setting(s) (e.g., the second setting(s)).

The process 900, at block 916 may transmit data corresponding to the second audio setting(s) to the first wireless headphone 102(1). For instance, the second wireless headphone 102(2) may transmit, via the third communication channel 114, the second audio setting(s) to the first wireless headphone 102(1).

The process 900, at block 918 may receive an indication that the first wireless headphone 102(1) is configured according to the second audio setting(s). For instance, the second wireless headphone 102(2) may receive, via the third communication channel 114, an indication that the first wireless headphone 102(1) is configured according to the second audio setting(s).

Figure 10:
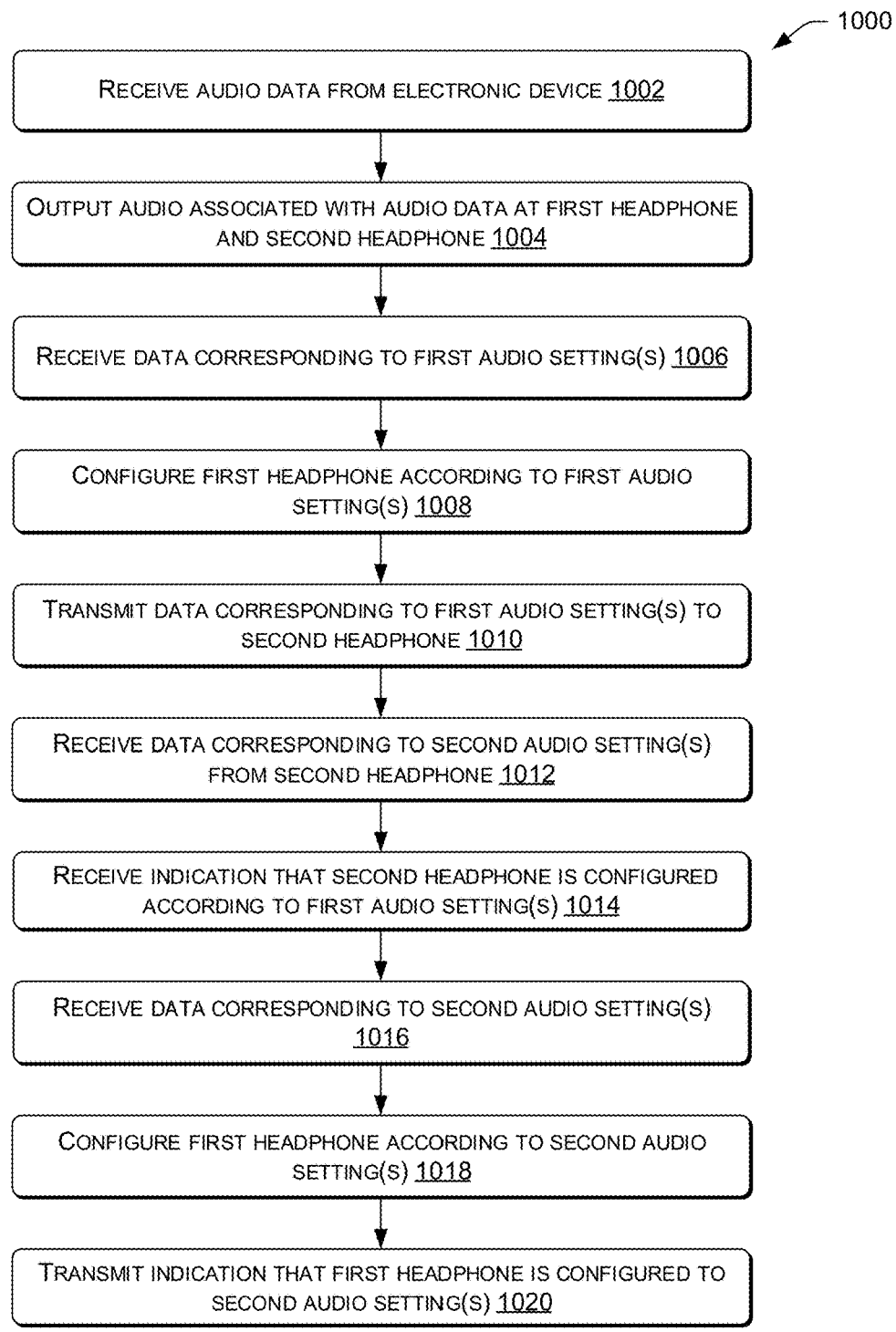

FIG. 10 illustrates an example process 1000 to configure wireless headphones according to setting(s).

The process 1000, at block 1002 may receive audio data at a first wireless headphone from an electronic device.

The process 1000, at block 1004 may output audio associated with the audio data at the first wireless headphone 102(1) and the second wireless headphone 102(2).

The process 1000, at block 1006 may receive data corresponding to first audio setting(s). In some instances, data indicating the first audio setting(s) may be received from the mobile device 104, at the first wireless headphone 102(1), or from the second wireless headphone 102(2). In some instances, the first audio setting(s) may be received during a first period of time.

The process 1000, at block 1008 may configure the first wireless headphone according to the first audio setting(s). For instance, the data corresponding to the first audio setting(s) may be received at the first wireless headphone 102(1), and the first wireless headphone 102(1) may configure according to the first audio setting(s).

The process 1000, at block 1010 may transmit data corresponding to the first audio setting(s) to the second wireless headphone 102(2). For instance, the first wireless headphone 102(1) may transmit, via a third communication channel 114, the data indicating the first audio setting(s) to the second wireless headphone 102(2).

The process 1000, at block 1012 may receive data corresponding to second audio setting(s). For instance, the first wireless headphone 102(1) may receive data indicating the second audio setting(s) via the third communication channel 114. In some instances, data indicating the second audio setting(s) may be received during a second period of time that is after the first period of time (at which the first audio setting(s) were received). In some instances, because the first wireless headphone 102(1) has yet to receive an indication from the second wireless headphone 102(2) that the second wireless headphone 102(2) has been configured according to the first audio setting(s), the first wireless headphone 102(1) may ignore, discard, or queue the second audio setting(s). In some instances, the first wireless headphone 102(1) may transmit, via the third communication channel 114, an indication acknowledging the second setting(s) were received from the second wireless headphone 102(2).

The process 1000, at block 1014 may receive an indication that the second wireless headphone 102(2) is configured according to the first audio setting(s). For instance, the first wireless headphone 102(1) may receive, from the second wireless headphone 102(2), via the third communication channel 114, an indication that the second wireless headphone 102(2) is configured according to the first audio setting(s).

The process 1000, at block 1016 may receive data corresponding to the second audio setting(s). For instance, the first wireless headphone 102(1) may receive data indicating the second audio setting(s) (whether from the queue and/or the second wireless headphone 102(2)). In some instances, the first wireless headphone 102(1) may receive the second audio setting(s) during a fourth period of time after the third period of time.

The process 1000, at block 1018 may configure the first wireless headphone 102(1) according to the second audio setting(s). In some instances, the first wireless headphone 102(1) may configure to the second audio setting(s) during a fifth period of time after the fourth period of time.

The process 1000, at block 1020 may transmit an indication that the first wireless headphone 102(1) is configured according to the second audio setting(s).

Figure 11:
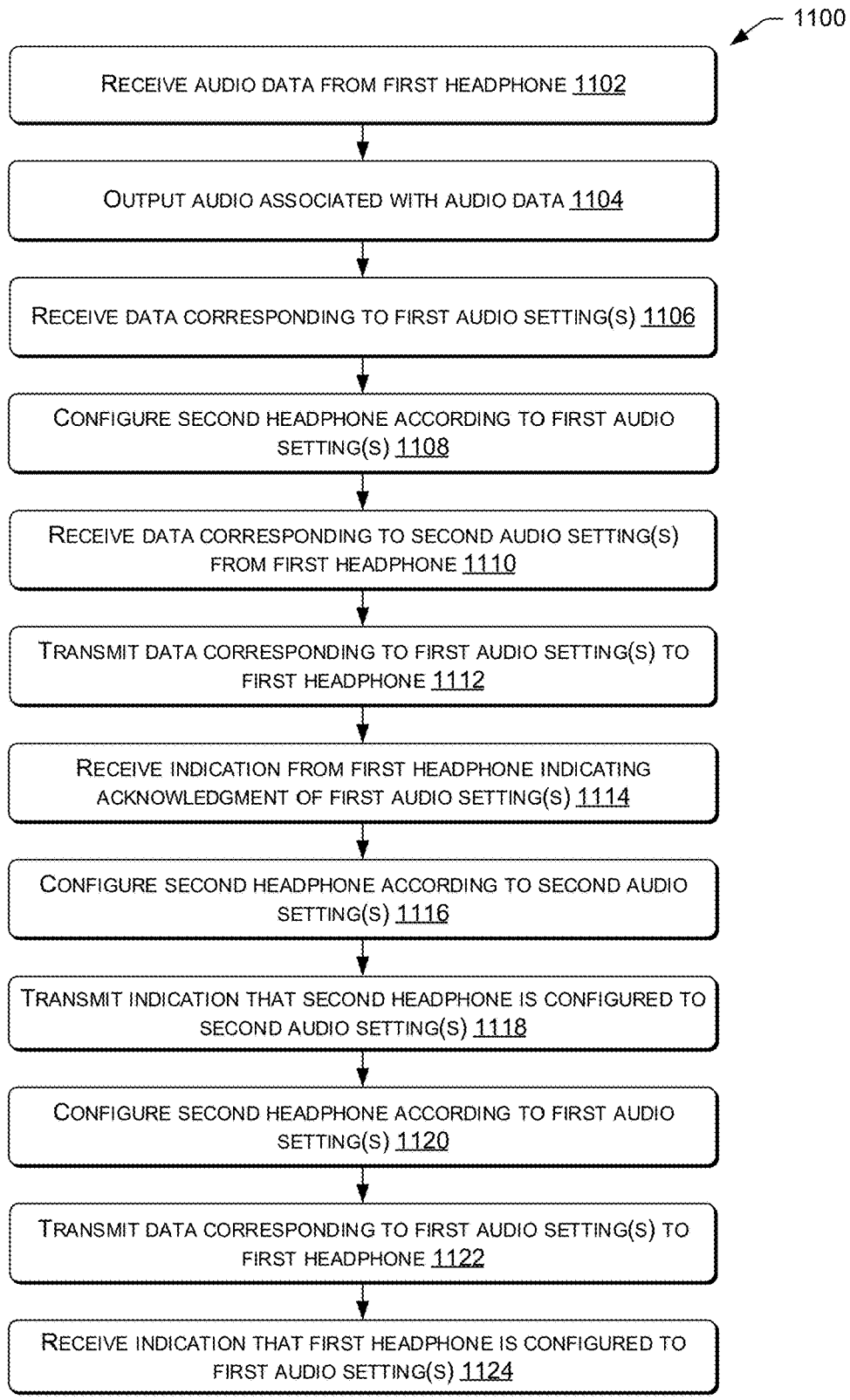

FIG. 11 illustrates an example process 1100 to configure wireless headphones according to setting(s).

The process 1100, at block 1102 may receive audio data from the first wireless headphone 102(1). For instance, second wireless headphone 102(2) may receive, via a second communication channel 110, audio data from the first wireless headphone 102(1). The process 1100, at block 1104 may output audio associated with the audio data at the second wireless headphone 102(2).

The process 1100, at block 1106 may receive data corresponding to first audio setting(s). For instance, the second wireless headphone 102(2) may receive data indicating first audio setting(s) at the second wireless headphone 102(2) (e.g., touch, voice, etc.). In some instances, the second wireless headphone 102(2) may receive the first audio setting(s) during a first period of time.

The process 1100, at block 1108 may configure the second wireless headphone 102(2) according to the first audio setting(s). In some instances, the second wireless headphone 102(2) may configure according to the second audio setting(s) during a second period of time that is after, overlaps, or partially overlaps with the first period of time.

The process 1100, at block 1110 may receive data corresponding to second audio setting(s). For instance, the second wireless headphone 102(2) may receive data indicating the second audio setting(s) from the first wireless headphone 102(1) via the third communication channel 114. In some instances, the second wireless headphone 102(2) may receive the second audio setting(s) during a third period of time that is after the first period of time, the second period of time, or during the first period of time or the second period of time.

The process 1100, at block 1112 may transmit data corresponding to the first audio setting(s) to the first wireless headphone 102(1). For instance, the second wireless headphone 102(2) may transmit, via the third communication channel 114, the first setting(s) to the first wireless headphone 102(1). In some instances, the second wireless headphone 102(2) may transmit the first audio setting(s) during a fourth period of time that is after the third period of time.

The process 1100, at block 1114 may receive an indication from the first wireless headphone 102 acknowledging the first audio setting(s). For instance, the second wireless headphone 102(2) may receive an indication that the first wireless headphone 102(1) is refusing the first audio setting(s) as the first wireless headphone 102(1) has yet to receive an indication that the second wireless headphone 102(2) has configured according to the second audio setting(s). In this sense, the indication may inform that the first wireless headphone 102(1) is "locked" and will not configure according to other audio setting(s) until receiving an indication that the second setting(s) have been configured at the second wireless headphone 102(2). The indication received at block 1114 may in some instances, request the second wireless headphone 102(2) to configure according to the second audio setting(s).

The process 1100, at block 1116 may configure the second wireless headphone according to the second audio setting(s). The second wireless headphone 102(2) may configure according to the second setting(s) at a fifth period of time after that is after the fourth period of time.

The process 1100, at block 1118 may transmit an indication that the second wireless headphone is configured according to the second audio setting(s). For instance, the second wireless headphone 102(2) may transmit, to the first wireless headphone 102(1), via the third communication channel 114, an indication that the second wireless headphone 102(2) is configured according to the second audio setting(s).

The process 1100, at block 1120 may configure the second wireless headphone 102(2) according to the first audio setting(s).

The process 1100, at block 1122 may transmit data corresponding to the first audio setting(s) to the first wireless headphone 102(1). For instance, the second wireless headphone 102(2) may transmit, via the third communication channel 114, the data indicating the first audio setting(s) to the first wireless headphone 102(1). In some instances, the second wireless headphone 102(2), rather than transmitting the first audio setting(s) again, as the first audio setting(s) have already been transmitted (e.g., block 1112), the second wireless headphone 102(2) may instead transmit a request to the first wireless headphone 102(1) that may be, for instance, a request to un-queue data corresponding to the first audio setting(s) stored in memory of the first wireless headphone 102(1).

The process 1110, at block 1124 may receive an indication that the first wireless headphone 102(1) is configured according to the first audio setting(s).

Figure 12:
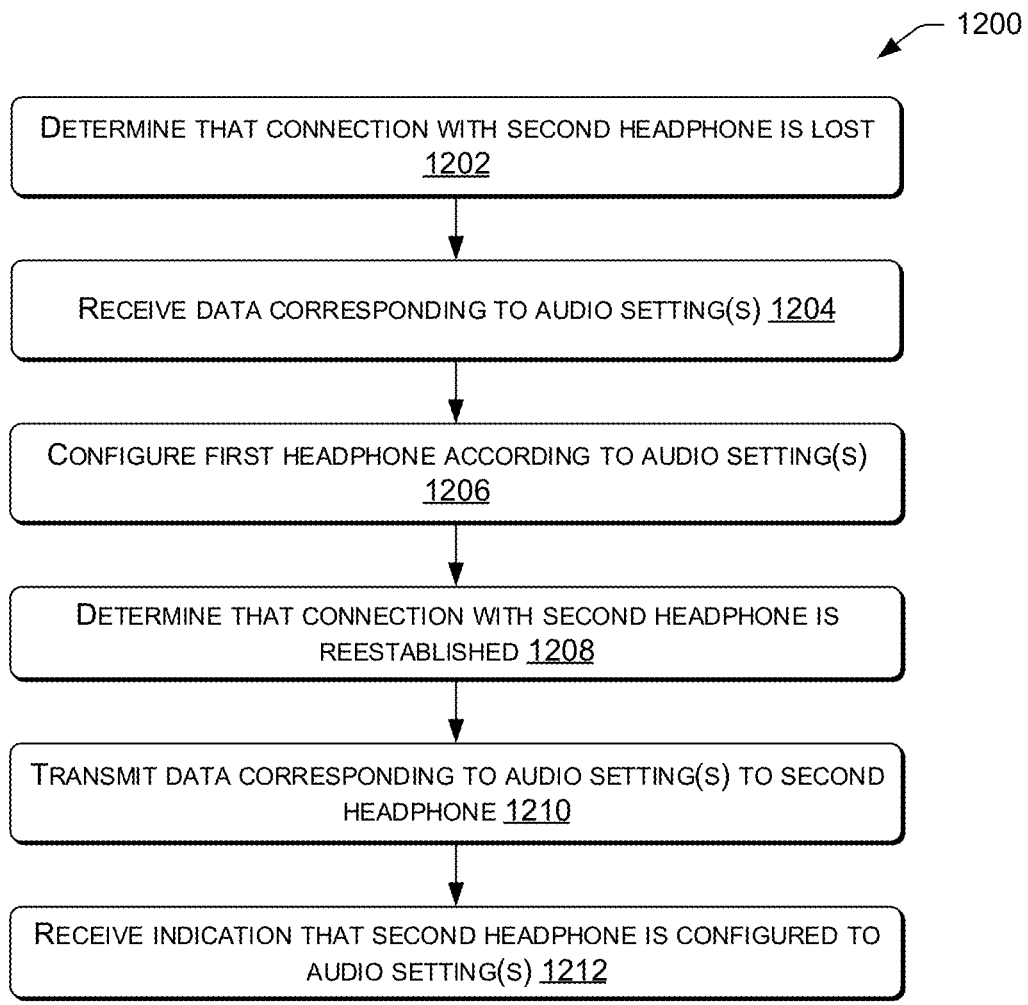

FIG. 12 illustrates a process 1200 when a connection between a first wireless headphone 102(1) and a second wireless headphone 102(2) is lost.

The process 1200, at 1202 may determine that a connection with the second wireless headphone 102(1) is lost. For instance, the first wireless headphone 102(1) may receive an indication, or be notified, that the third communication channel 114 between the first wireless headphone 102(1) and the second wireless headphone 102(2) is lost.

The process 1200, at 1204 may receive data corresponding to audio setting(s). For instance, the first wireless headphone 102(1) may receive data indicating to increase the volume of the audio.

The process 1200, at 1206 may configure the first wireless headphone 102(1) according to the audio setting(s).

The process 1200, at 1208 may determine that the connection with the second wireless headphone 102(2) is reestablished. For instance, the first wireless headphone 102(1) may receive an indication that the third communication channel 114 is reestablished. In some instances, if the first wireless headphone 102(1) receives multiple audio setting(s) while the third communication channel 114 is lost, the first wireless headphone 102(1) may transmit data corresponding to the most recent audio setting(s) upon the third communication channel 114 being reestablished.

The process 1200, at 1210 may transmit data corresponding to the audio setting(s) to the second wireless headphone 102(2). In some instances, transmitting the data may be based at least in part on receiving the indication at 1208. As such, after the third communication channel 114 has been reestablished, the first wireless headphone 102(1) may transmit the audio setting(s) to the second wireless headphone 102(2). It is to be appreciate that before 1210, because the third communication channel 114 between the wireless headphones 102 is lost, the first wireless headphone 102(1) is unable to transmit the audio setting(s) to the second wireless headphone 102(2). Accordingly, in some instances, the first wireless headphone 102(1) and the second wireless headphone 102(2) may output different audio setting(s) (e.g., first volume at first wireless headphone 102(1) and second volume at second wireless headphone 102(2)) until third communication channel 114 is reestablished. In these situations, in some instances, if the connection is lost, the first wireless headphone 102(1) may refrain from configuring according to audio setting(s) or may queue the setting(s) until the connection is reestablished.

The process 1200, at 1212, may receive an indication that the second wireless headphone 102(2) is configured according to the audio setting(s).

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. An audio system comprising:
   a first wireless headphone; and
   a second wireless headphone;
   wherein the first wireless headphone comprises:
   one or more first processors; and
   one or more first non-transitory computer-readable media storing computer-executable instructions that, when executed by the one or more first processors, cause the one or more first processors to perform acts comprising:
   receiving audio data from a mobile device via a Bluetooth communication channel;
   transmitting the audio data to the second wireless headphone via a near field magnetic induction (NFMI) communication channel;
   receiving data corresponding to a setting of the audio system;
   configuring the first wireless headphone according to the setting;
   transmitting the data corresponding to the setting to the second wireless headphone via a Bluetooth Low Energy (BLE) communication channel; and
   receiving, from the second wireless headphone via the BLE communication channel, an indication that the second wireless headphone has been configured according to the setting.

2. The audio system as recited in claim 1, wherein the data corresponding to the setting of the audio system is received at the first wireless headphone from the second wireless headphone via the BLE communication channel.

3. The audio system as recited in claim 1, wherein:
   the setting of the audio system comprises a first setting;
   the data comprises first data;
   the indication comprises a first indication; and
   the second wireless headphone comprises one or more second processors and one or more second non-transitory computer-readable media storing computer-executable instructions that, when executed by the one or more second processors, cause the one or more second processors to perform acts comprising:
   receiving second data corresponding to a second setting of the audio system prior to configuring the second wireless headphone according to the first setting;
   configuring the second wireless headphone according to the first setting;
   configuring the second wireless headphone according to the second setting after configuring the second wireless headphone according to the first setting;
   transmitting the second data to the first wireless headphone via the BLE communication channel; and
   receiving, from the first wireless headphone via the BLE communication channel, a second indication that the first wireless headphone has been configured according to the second setting.

4. The audio system as recited in claim 1, wherein:
   the data comprises first data;
   the setting of the audio system comprises a first setting;
   the indication comprises a first indication; and
   the one or more first non-transitory computer-readable media further store computer-executable instructions that, when executed by the one or more first processors, cause the one or more first processors to perform acts comprising:
   receiving second data corresponding to a second setting of the audio system from the second wireless headphone, the second data being received prior to receiving the first indication;

transmitting a second indication that the first wireless headphone has received the second data from the second wireless headphone;

receiving the second data corresponding to the second setting of the audio system from the second wireless headphone after receiving the first indication;

configuring the first wireless headphone according to the second setting; and transmitting a third indication that the first wireless headphone has been configured according to the second setting.

5. The audio system as recited in claim 1, wherein:

the indication comprises a first indication;

the receiving the data corresponding to the setting of the audio system comprises receiving the data during a first period of time; and the one or more first non-transitory computer-readable media further store computer-executable instructions that, when executed by the one or more first processors, cause the one or more first processors to perform acts comprising:

determining, during a second period of time that is after the first period of time, that a connection with the second wireless headphone has been lost;

determining, during a third period of time that is after the second period of time, that the connection with the second wireless headphone has been reestablished; and transmitting during a fourth period of time that is after the third period of time, the data to the second wireless headphone via the BLE communication channel.

6. A method implemented at least in part by a first wireless headphone communicatively coupled to an electronic device and a second wireless headphone, the method comprising:

receiving, at the first wireless headphone, audio data from the electronic device via a first communication channel;

transmitting the audio data from the first wireless headphone to the second wireless headphone via a second communication channel that is different than the first communication channel;

receiving, at the first wireless headphone, an instruction to alter a setting of audio output by the first wireless headphone;

executing the instruction at the first wireless headphone; and transmitting the instruction from the first wireless headphone to the second wireless headphone via at least one of the second communication channel or a third communication channel that is different than the second communication channel.

7. The method as recited in claim 6, further comprising receiving, from the second wireless headphone and at the first wireless headphone via the at least one of the second communication channel or the third communication channel, an indication that the second wireless headphone has executed the instruction.

8. The method as recited in claim 7, wherein the instruction is a first instruction, the method further comprising:

receiving, at the first wireless headphone, a second instruction from the second wireless headphone via at least one of the second communication channel or the third communication channel; and executing the second instruction at the first wireless headphone based at least in part on receiving the indication.

9. The method as recited in claim 6, wherein:

the first communication channel comprises Bluetooth, the second communication channel comprises near field magnetic induction (NFMI), the third communication channel comprises Bluetooth Low Energy (BLE); and transmitting the instruction from the first wireless headphone to the second wireless headphone comprises transmitting the instruction via the third communication channel.

10. The method as recited in claim 6, wherein the instruction corresponds to at least one of:

increasing a volume of the audio output;

decreasing a volume of the audio output;

muting one or more first microphones of the first wireless headphone;

muting one or more second microphones of the second wireless headphone;

noise-canceling;

ceasing output of the audio output;

resuming output of the audio output; or answering a phone call.

11. The method as recited in claim 6, wherein the instruction to alter the setting of the audio output by the first wireless headphone is a first instruction to alter a first setting of the audio output, the method further comprising:

receiving, at the first wireless headphone and from the second wireless headphone, a second instruction to alter a second setting of the audio output by the first wireless headphone;

executing the second instruction at the first wireless headphone; and transmitting an indication from the first wireless headphone to the second wireless headphone indicating that the first wireless headphone has executed the second instruction.

12. The method as recited in claim 6, wherein the instruction to alter the setting of the audio output by the first wireless headphone is a first instruction to alter a first setting of the audio output, the method further comprising:

receiving, at the first wireless headphone and substantially contemporaneously with transmitting the first instruction, a second instruction from the second wireless headphone to alter a second setting of the audio output by the first wireless headphone;

transmitting, to the second wireless headphone, a first indication acknowledging a receipt of the second instruction;

receiving, from the second wireless headphone and at the first wireless headphone, a second indication that the second wireless headphone has executed the first instruction;

receiving, at the first wireless headphone, the second instruction to alter the second setting of the audio output by the first wireless headphone; and transmitting a third indication from the first wireless headphone to the second wireless headphone that the first wireless headphone has executed the second instruction.

13. The method as recited in claim 6, further comprising:

determining that the at least one of the second communication channel or the third communication channel between the first wireless headphone and the second wireless headphone has been reestablished, and wherein the transmitting the instruction comprises transmitting the instruction based at least in part on determining that the at least one of the second communication channel or the third communication channel between the first wireless headphone and the second wireless headphone has been reestablished.

14. A first wireless headphone, comprising:
one or more first processors;
one or more speakers; and
one or more first computer-readable media storing computer-executable instructions that, when executed by the one or more first processors, cause the one or more first processors to perform acts comprising:
receiving audio data from an electronic device over a first communication channel;
transmitting the audio data to a second wireless headphone over a second communication channel that is different than the first communication channel;
outputting audio associated with the audio data on the one or more speakers;
receiving a command to alter output of the audio;
executing the command; and
transmitting the command to the second wireless headphone over at least one of the second communication channel or a third communication channel that is different than the second communication channel.

15. The first wireless headphone as recited in claim 14, wherein the command is received at the first wireless headphone or from the electronic device.

16. The first wireless headphone as recited in claim 14, wherein the one or more first computer-readable media further store computer-executable instructions that, when executed by the one or more first processors, cause the one or more first processors to perform an act comprising receiving, from the second wireless headphone, an indication that the second wireless headphone has executed the command.

17. The first wireless headphone as recited in claim 14, wherein the command relates to at least one of:
ceasing output of the audio;
increasing a volume of the audio;
muting the audio;
decreasing the volume of the audio; or
resuming output of the audio.

18. The first wireless headphone as recited in claim 14, wherein:
the first communication channel comprises Bluetooth;
the second communication channel comprises near field magnetic induction (NFMI); and
the third communication channel comprises Bluetooth low energy (BLE).

19. The first wireless headphone as recited in claim 14, wherein the command is a first command and the one or more first computer-readable media further store computer-executable instructions that, when executed by the one or more first processors, cause the one or more first processors to perform acts comprising:
receiving, from the second wireless headphone, a second command to alter output of the audio;
executing the second command; and
transmitting an indication to the second wireless headphone indicating that the first wireless headphone has executed the second command.

20. The first wireless headphone as recited in claim 14, further comprising a touch sensor, and the one or more first computer-readable media further store computer-executable instructions that, when executed by the one or more first processors, cause the one or more first processors to perform acts comprising:
receiving touch input at the touch sensor, and
wherein the touch input corresponds to the command to alter the output of the audio.

21. A method comprising:
receiving, at a first wireless headphone, audio data from an electronic device;
transmitting at least a portion of the audio data from the first wireless headphone to a second wireless headphone via a first communication channel;
receiving, at the first wireless headphone, an instruction to alter a setting of audio output by the first wireless headphone;
causing the instruction to be performed at the first wireless headphone; and
transmitting data associated with the instruction from the first wireless headphone to the second wireless headphone via a second communication channel that is different than the first communication channel.

* * * * *